(12) United States Patent
Nagao

(10) Patent No.: US 7,133,938 B2
(45) Date of Patent: Nov. 7, 2006

(54) HUB CONTROLLER WITH CONNECTED FIRST AND SECOND DEVICE WHEREIN SECOND DEVICE CONTAINS DRIVERS AND FIRST DEVICE IN DISABLE STATE BEFORE DRIVER READ FROM SECOND DEVICE

(75) Inventor: Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 34 days.

(21) Appl. No.: 10/335,890

(22) Filed: Jan. 3, 2003

(65) Prior Publication Data
US 2003/0163611 A1 Aug. 28, 2003

(30) Foreign Application Priority Data
Feb. 26, 2002 (JP) ............................. 2002-050578

(51) Int. Cl.
*G06F 12/00* (2006.01)
*G06F 13/00* (2006.01)
*G06F 3/00* (2006.01)

(52) U.S. Cl. ............................ 710/10; 710/8; 710/14; 710/38; 710/103; 710/110; 713/1; 713/2; 713/191; 703/24; 703/25

(58) Field of Classification Search ................ 710/8, 710/10, 14, 38, 103, 110; 713/1, 2, 191; 703/24, 25
See application file for complete search history.

(56) References Cited

U.S. PATENT DOCUMENTS

| 5,784,581 A | * | 7/1998 | Hannah | ........................ 710/110 |
| 6,009,480 A | * | 12/1999 | Pleso | ............................ 710/8 |
| 6,389,495 B1 | * | 5/2002 | Larky et al. | ................... 710/8 |
| 6,574,588 B1 | * | 6/2003 | Shapiro et al. | ............... 703/24 |
| 6,704,824 B1 | * | 3/2004 | Goodman | ................... 710/300 |
| 2003/0110389 A1 | * | 6/2003 | Elteto | ......................... 713/191 |

FOREIGN PATENT DOCUMENTS

| JP | 2000-194645 | 7/2000 |
| JP | 2000-322241 | 11/2000 |

* cited by examiner

Primary Examiner—Tammara Peyton
(74) Attorney, Agent, or Firm—Staas & Halsey LLP

(57) ABSTRACT

A general-purpose electronic device, a method of controlling the same, and an information processing system are provided. This electronic device has a function of automatically installing its driver in the information processing system. The driver is stored in the electronic device. The electronic device includes a first device and a second device in which the driver of the first device is stored. The first and second devices generate transactions on a common interface for external connection. The operation of the second device is started before the operation of the first device, and a means is employed to make the driver readable from the second device through the common interface.

18 Claims, 25 Drawing Sheets

HUB CONTROLLER WITH CONNECTED FIRST AND SECOND DEVICE WHEREIN SECOND DEVICE CONTAINS DRIVERS AND FIRST DEVICE IN DISABLE STATE BEFORE DRIVER READ FROM SECOND DEVICE

BACKGROUND OF THE INVENTION

1. Field of the Invention

The present invention generally relates to an electronic device that has a driver stored therein and a method of controlling the electronic device, and more particularly, to a technique of installing the driver of the electronic device in an information processing apparatus to which the electronic device is to be connected as a peripheral device.

2. Description of the Related Art

There is a type of information processing system that includes an information processing apparatus and an electronic device connected to the information processing apparatus. The electronic device serves as a peripheral device for the information processing apparatus, and is controlled by the operating system (OS) of the information processing apparatus. The OS requires dedicated software to control the peripheral device. This software is referred to as a device driver or simply as a driver. The device driver is installed in the information processing apparatus, so that the peripheral device can exhibit its performance on the information processing apparatus.

FIG. 1 is a block diagram of a conventional information processing process. A peripheral device 20 having an USB (Universal Serial Bus) interface is connected to an information processing system 10 with a USB. The information processing system 10 will be hereinafter referred to simply as the "PC 10", and the peripheral device 20 as the "USB device 20". The USB device 20 shown in FIG. 1 is a keyboard. The PC 10 includes a USB host controller 14 and a storage device 15. The storage device 15 is a flexible magnetic disk (FD) or a CD-ROM, for example. A keyboard driver 12 and a storage device driver 13 are installed in the OS 11 of the PC 10, and are connected to the USB host controller 14 and the storage device 15 via internal buses 16 and 17, respectively. The USB device 20 includes a keyboard device 21 so as to function as a keyboard. The keyboard device 21 is connected to the USB host controller 14 via a USB cable 18. The OS 11 may be the Windows (a trademark), which is produced by Microsoft Corporation.

As the USB device 20 is connected to the PC 10 with the USB cable 18, the USB host controller 14 detects the connection of new software. To install a driver of the USB device 20, the USB host controller 14 requests for a FD or CD-ROM storing a driver to be mounted to the driver of the storage device 15. The driver (the keyboard driver 12 in this case) of the USB device 20 is read from the mounted FD, and is installed in the OS 11. In this manner, the software to control the peripheral device is installed by a recording medium and a device different from the peripheral device.

In a notebook-type personal computer or a PDA (Personal Digital Assistant), an FD drive and a CD-ROM drive are not mounted on the PC 10. Therefore, to install the keyboard driver 12 by the above method, an external device such as a USB external storage device 22 shown in FIG. 2 needs to be employed so as to connect the keyboard driver 12 to the USB host controller 14 of the PC 10 with a USB 19.

To solve this problem, Japanese Unexamined Patent Publication No. 2000-322241 discloses a structure in which the peripheral device holds software. This publication teaches that a driver is read from a storage device in a peripheral device and is automatically installed in the OS.

However, the art disclosed in this publication is based on the assumption that the storage device mounted on the peripheral unit can be always read and written, with the peripheral device being connected to a host device. Therefore, according to the art disclosed in the above publication, read and write cannot be performed when the storage device mounted on the peripheral device is disabled.

Taking as an example a case where a USB is employed as an interface with a peripheral device in the "Windows" (a trademark of Microsoft Corporation), which has the largest marketing share as the OS operating on PCs, the above-described problem of the prior art will be described below with reference to FIG. 3.

A peripheral device 23 shown in FIG. 3 is a USB device that includes a keyboard device 24 and a USB external storage device 25. The USB external storage device 25 has a keyboard driver stored therein. Before the USB external storage device 25 is connected, the keyboard driver 12 has not been installed in the OS 11. As soon as the USB device 23 is connected to the PC 10 for the first time, the USB host controller 14 automatically recognizes that the keyboard device 24 has been connected to the USB external storage device 25 via the USB host controller 14. This is because the keyboard device 24 and the USB external storage device 25 can generate transactions (operations to be performed by the PC) on a common USB interface. Since the keyboard driver has not been installed in this case, the USB host controller 14 requests for the input of the location of the file in which the driver of the keyboard device 24 is stored. Even if the OS 11 has the driver of the USB external storage device 25, it is impossible for the USB structure to read the keyboard driver from the USB external storage device 25, with an unknown keyboard driver existing, i.e., with the USB device 23 having not been recognized. Accordingly, the USB device 23 mounted on the USB external storage device 25 cannot be put into practical use.

In this case, the OS 11 requests the operator to input the location of the file in which the keyboard driver is stored. As the USB device 23 has not been recognized at this point, the USB external storage device 25 cannot be of course designated. The operator therefore needs to prepare a separate recording medium in which the keyboard driver is stored. Receiving this request, the operator inputs the location of a suitable recording medium or a file in which a suitable driver is stored, so that the installation of the keyboard driver can be resumed.

As described above, the USB external storage device 25 mounted on the USB device 23 cannot be used unless the use of the USB device 23 is allowed. Accordingly, the keyboard driver cannot be read from the USB external storage device 25 and then installed.

This problem can be seen not only with USB interfaces, but also with other type of interfaces.

Japanese Unexamined Patent Publication No. 2000-194645 discloses a technique of facilitating installation and rewrite of a driver of a peripheral device with a USB. This publication teaches that a ROM having a plurality of device drivers stored therein is installed in the USB device. When the USB device is connected to a PC, the corresponding control data is read from the ROM under the control of a USB host device, so that the USB device is set to the first configuration. The first configuration defines the state in which data can be transferred from the USB device to the host device. In this defined state, a device driver is read from the ROM, and is then transferred to the USB host device.

The transferred device driver is stored in the memory of the host device. The USB host device then sends a request for another configuration to the USB device. Receiving this request, the USB device is set to the second configuration from the first configuration. Thus, the use of the function of the USB device can be allowed.

However, this method requires a special step of issuing an instruction from the USB host device to the USB device so as to switch configurations. For this reason, this method cannot be applied to a conventional PC having a USB host device installed therein as it is.

SUMMARY OF THE INVENTION

It is therefore an object of the present invention to provide an electronic device, a method of controlling the electronic device, and an information processing system in which the above disadvantages are eliminated.

A more specific object of the present invention is to provide a general-purpose electronic device that has a function of automatic installation of a device driver stored therein, a method of controlling the electronic device, and an information processing system.

The above objects of the present invention are achieved by an electronic device includes: a first device; a second device in which a driver of the first device is stored, the first device and second device being able to generate transactions on an interface shared for respective external connections; and a unit that starts an operation of the second device before starting an operation of the first device, so as to make the driver readable from the second device via the interface. When the electronic device is connected to an information processing device such as a personal computer, the unit causes the second device to start. This makes it possible the driver to be read on the interface from the second device. Thus, the driver can be installed in the information processing device. If it is supposed that the above-mentioned unit is not employed, the first and second devices can generate transactions on the interface shared for the respective external connections, and connections with the first and second devices will be simultaneously recognized. In this case, the information processing device will request the driver for the first device. In contrast, according to the aspect of the present invention, connection with the second device that stores the driver of the first device is recognized first without exception. This results in avoidance of the above-mentioned situation.

The above objects of the present invention are also achieved by a method of controlling an electronic device that includes a first device and a second device storing a driver of the first device, and can generate transactions on an interface shared for external connection, the method comprising the step of starting an operation of the second device before an operation of the first device, so as to make the driver readable from the second device via the interface.

The above objects of the present invention are also achieved by a system comprising: an electronic device that includes a first device and a second device storing a driver of the first device, and can generate transactions on an interface shared for respective external connections; and an information processing apparatus to be connected to the electronic device via the interface, the electronic device further including a unit that starts an operation of the second device before starting an operation of the first device, so as to make the driver readable from the second device via the interface.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of embodiments of the present invention, with reference to the accompanying drawings.

(First Embodiment)

Figure 1:
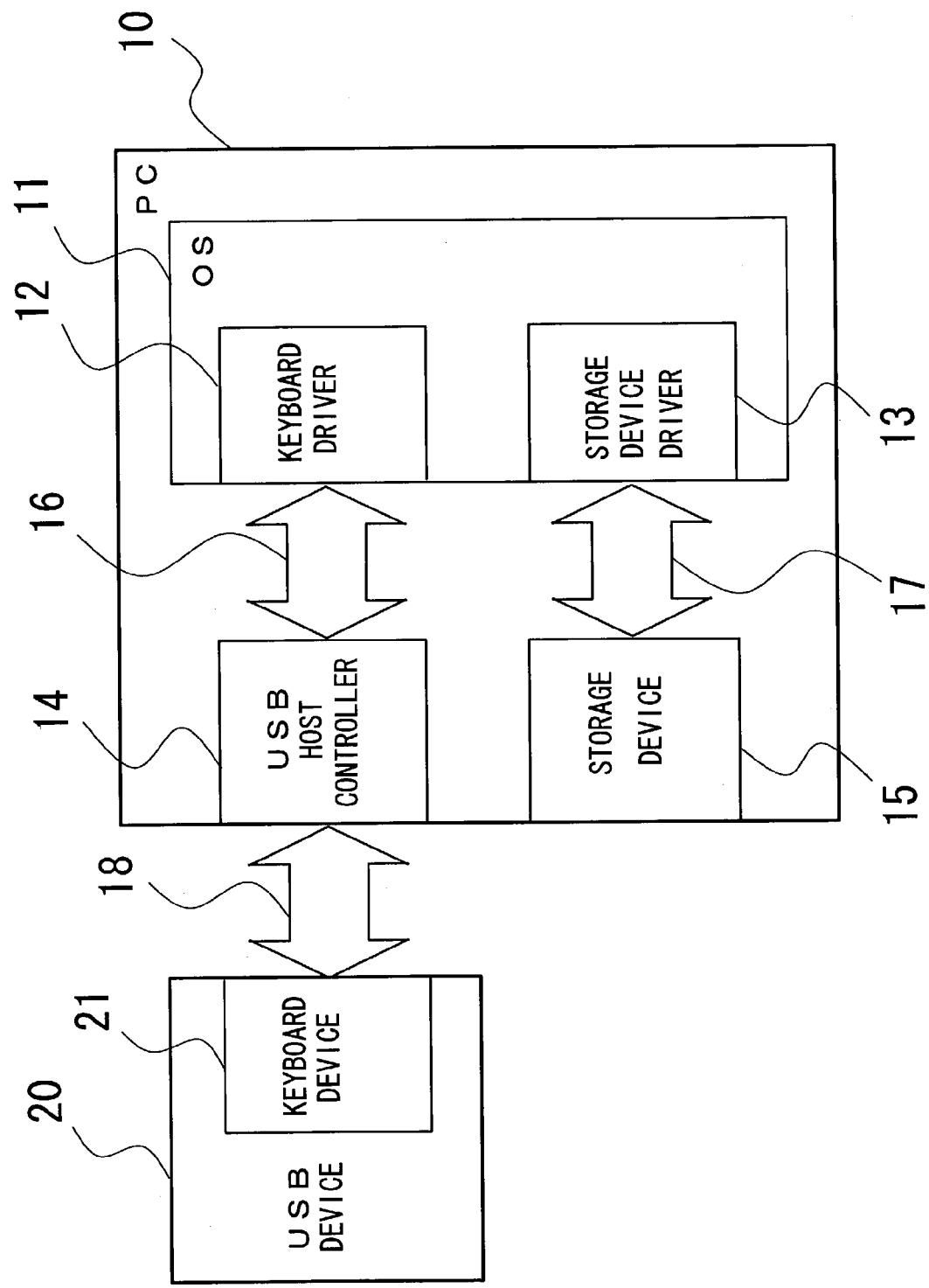
FIG. 1 is a block diagram of a conventional information processing system.
Figure 2:
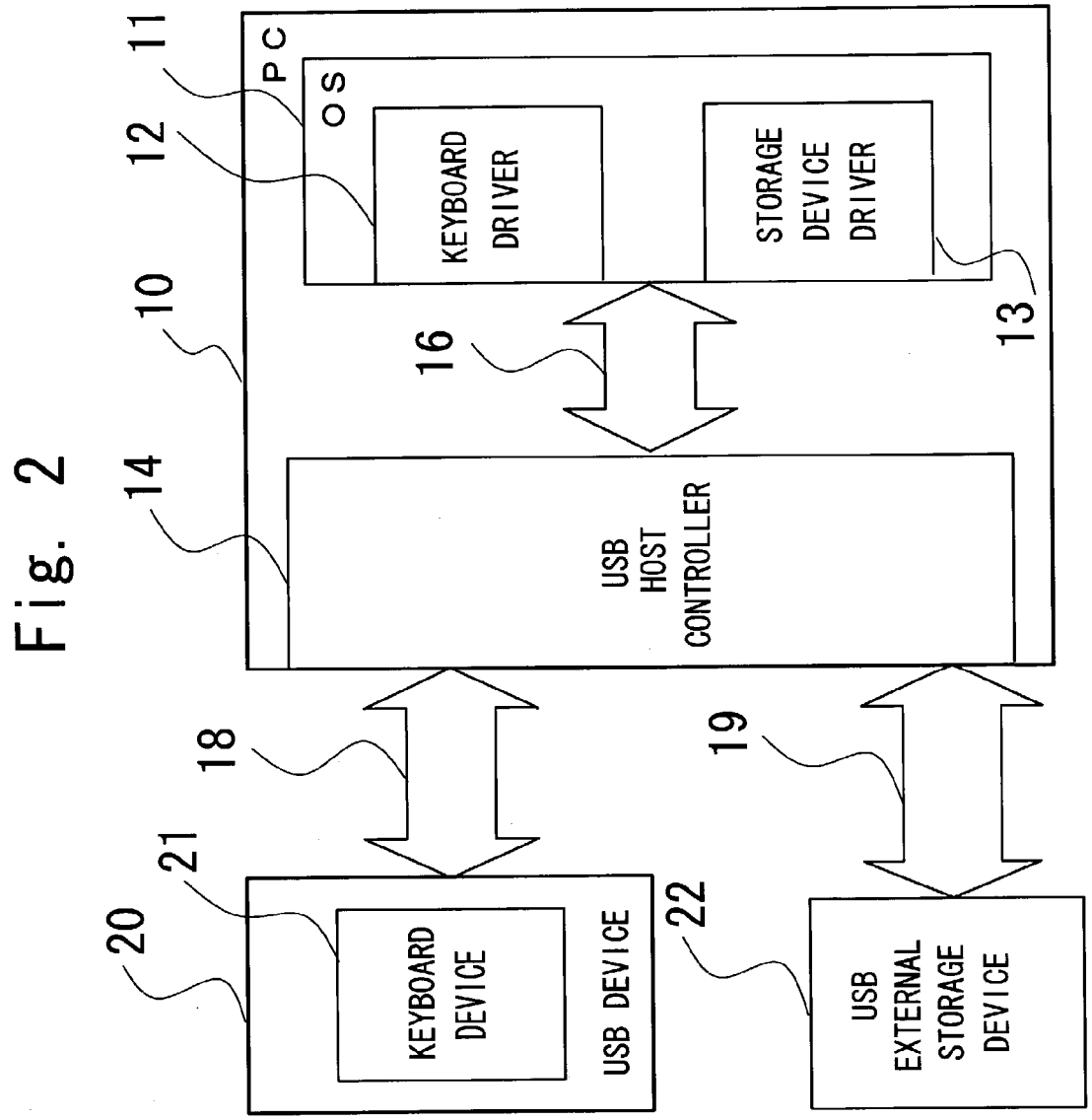
FIG. 2 is a block diagram illustrating a conventional method of installing a driver.
Figure 3:
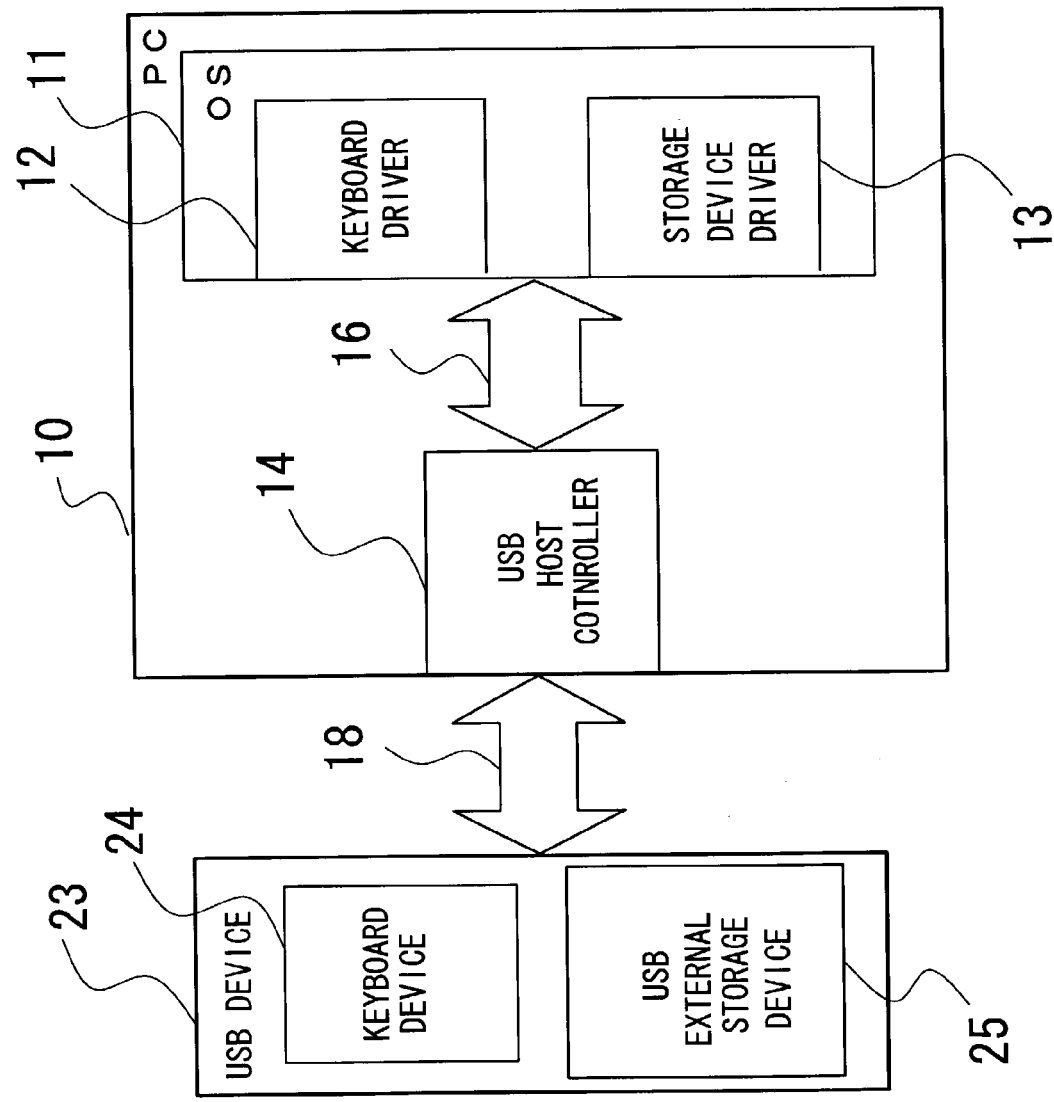
FIG. 3 is a block diagram illustrating the problems with the prior art.
Figure 4:
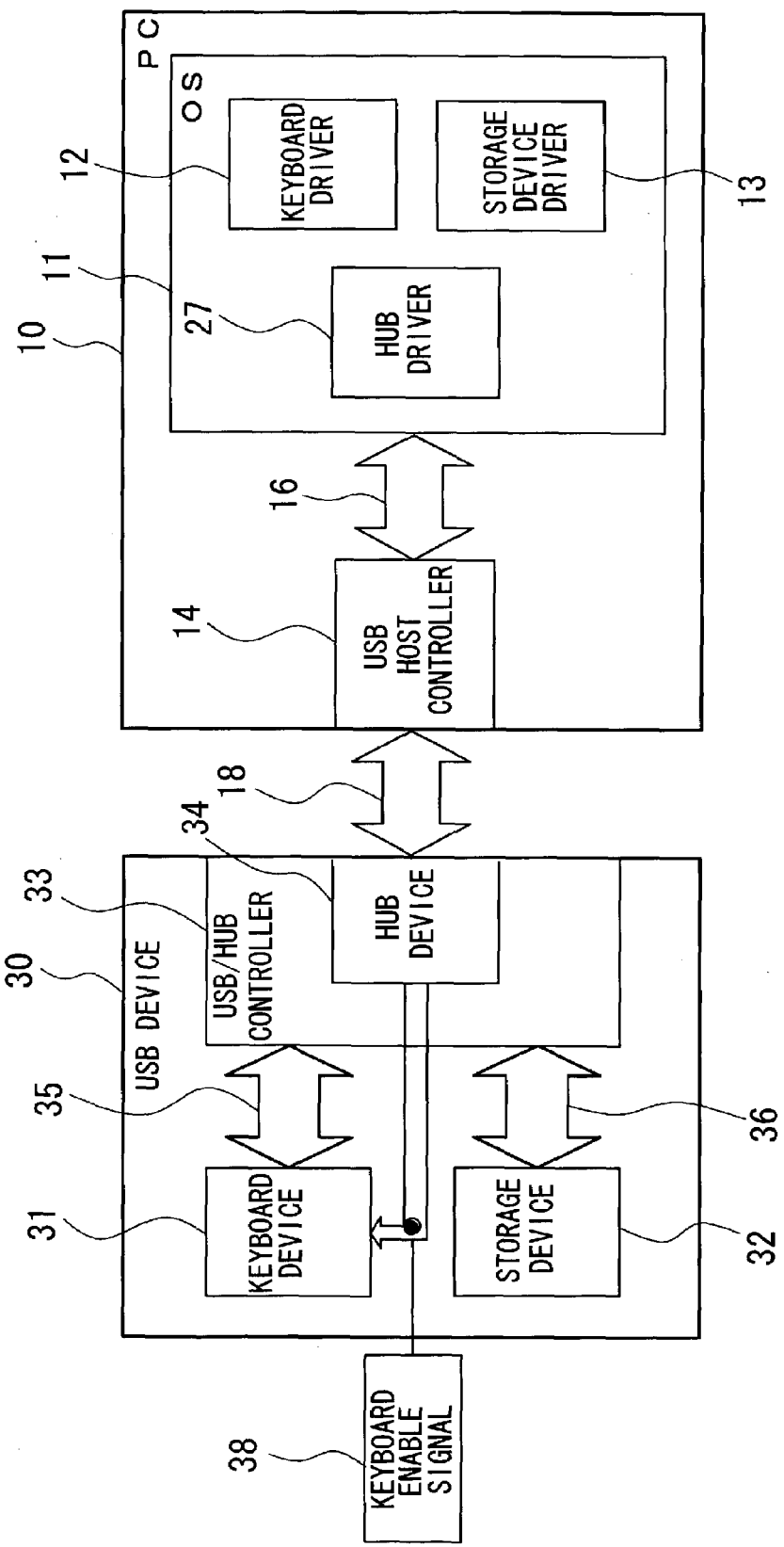
FIG. 4 is a block diagram of a structure according to a first embodiment of the present invention.

FIG. 4 is a block diagram of the structure of an information processing system according to a first embodiment of the present invention. This information processing system includes an information processing apparatus 10 and an electronic device 30. The information processing apparatus 10 may be a personal computer, for example. The electronic device 30 is a peripheral device that can be connected to the information processing apparatus 10, and is a keyboard in the example shown in FIG. 4. The information processing apparatus 10 and the electronic device 30 are connected to each other with a USB cable 18. Hereinafter, the electronic device 30 will be referred to as the "USB device 30", and the information processing apparatus 10 as the "PC 10".

The OS 11 of the PC 10 is the "Windows" (a trademark of Microsoft Corporation), for example. In FIG. 4, a keyboard driver 12, a storage device driver 13, and a hub driver 27 are installed in the OS 11. Among these drivers, the storage device driver 13 and the hub driver 27 are standard device drivers that are incorporated into the OS 11 in advance. The keyboard driver 12 is installed in a manner that will be described later. Although not shown, many programs, other various drivers, and various utilities are incorporated into the OS 11. The OS 11 is connected to the host controller 14 via an internal bus 16. The hardware structure of the PC 10 is the same as a general hardware structure including a CPU, a RAM, and a ROM. The USB host controller 14 supports the USB, and combines the functions of the peripheral device connected to the PC 10, so that the OS 11 can exhibit the functions of the peripheral device.

The USB device 30 includes a keyboard device 31, a storage device 32, and a hub device 34 located inside a USB/hub controller 33. These devices are peripheral functions for the PC 10, and therefore can generate transactions on the USB interface. As will be described later, one of the characteristics of the present invention resides in the sequence of these three devices providing the functions on the OS 11. The keyboard device 31 and the storage device 32 are connected to the USB/hub controller 33 via hub ports 35 and 36 that are USB buses.

The keyboard device 31 includes hardware and software that constitute a keyboard. The keyboard device 31 is put in an enable state or a disable state, in accordance with a keyboard enabling control signal 38 outputted from the hub device 34. In an enable state, the keyboard device 31 can be operated. In a disable state, the connection with the keyboard device 31 cannot be recognized on the USB interface. An example of a disable state of the keyboard device 31 will be described later. The keyboard enabling control signal 38 is a signal transmitted through a dedicated signal line that is provided separately from the USB ports 35 and 36, and is connected to a general input/output terminal or an external interrupt terminal of the keyboard device 31. When the level of the keyboard enabling control signal 38 is high, the keyboard device 31 is in an enable state. When the level of the keyboard enabling control signal 38 is low, the keyboard device 31 is in a disable state. When the keyboard device 31 is put in an enable state, the connection state is outputted to the hub port 35 in accordance with the standard USB specification. A specific example structure of the keyboard device 31 will be described later.

The storage device 32 includes hardware and software for providing a storing function. A keyboard driver is stored in this storage device 32. In accordance with a sequence that will be described later, the keyboard driver is read from the storage device 32, and is then incorporated into the OS 11 as the keyboard driver 12. The device driver of the storage device 32 is incorporated into the OS 11 as the storage device driver 13 in advance. A specific example structure of the storage device 32 will be described later.

The USB/hub controller 33 has hardware and software for supporting the USB and hub. The USB/hub controller 33 includes the hub device 34. The hub device 34 is an internal program that operates on a program for controlling the hub, and functions as a USB in this embodiment. The hub device 34 monitors the state of the USB cable 18, and outputs the keyboard enabling controlling signal 38 to the keyboard device 31. Here, a "hub" refers to a concentrator provided in accordance with the standard USB specification, and controls transactions among the keyboard device 31, the storage device 32, and a USB cable (or a USB bus or a USB interface) in the structure shown in FIG. 4. The USB/hub controller 33 connects the keyboard device 31 and the storage device 32 in accordance with the standard USB specification. A specific example structure of the USB/hub controller 33 will be described later.

Figure 5:
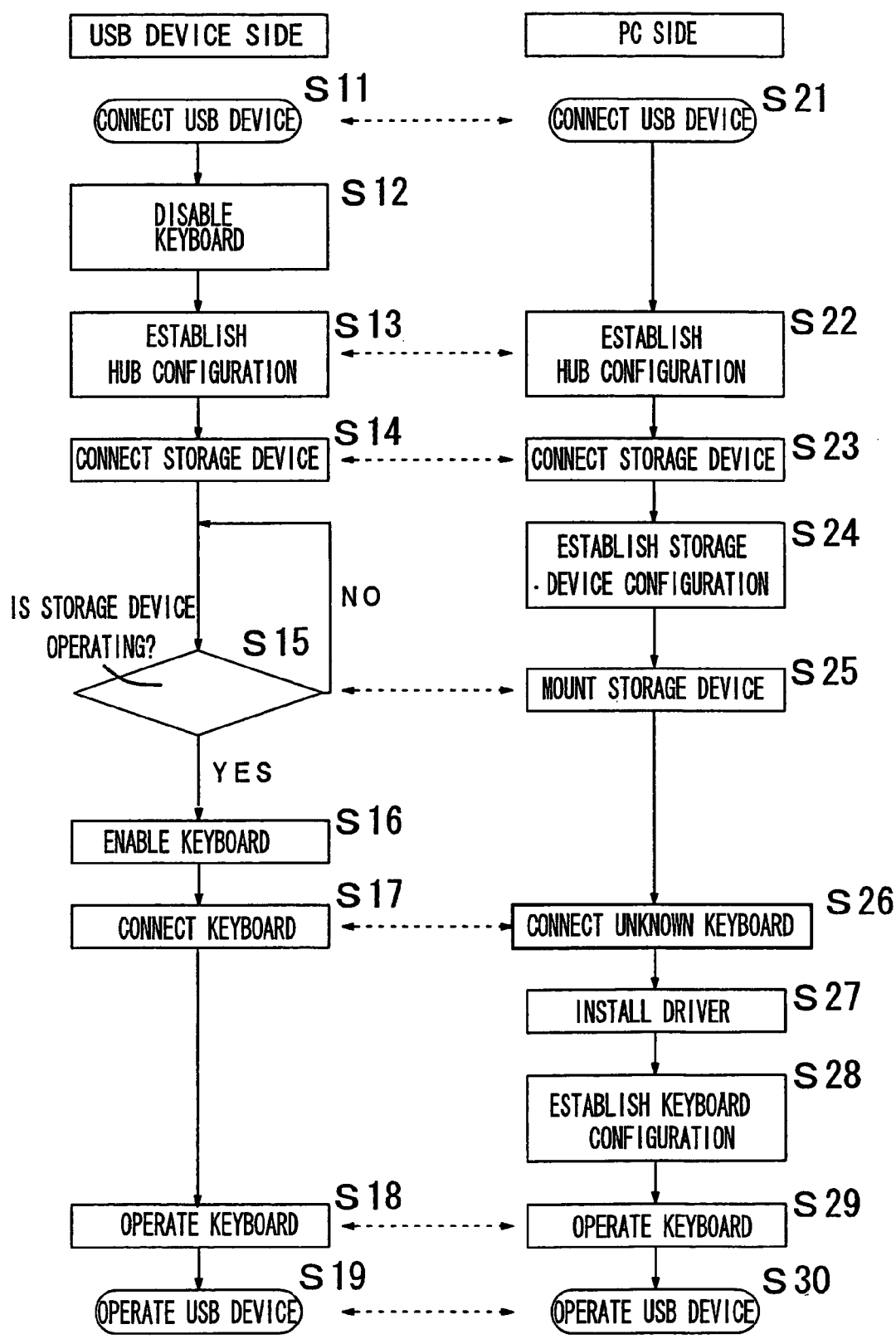
FIGS. 5(A) and 5(B) are a flowcharts of a sequence showing an operation according to the first embodiment.

Referring now to FIGS. 5A and 5B, the operation according to the first embodiment will be described. FIG. 5A shows the operation sequence of the USB device 30, and FIG. 5B shows the operation sequence of the PC 10.

In steps S11 and S21, the USB device 30 is connected to the PC 10 via the USB cable 18. More specifically, the connector of the PC 10 is connected to the connector of the USB device 30 with the USB cable 18. By this connection, a power source is supplied from the PC 10 to the USB device, and the USB/hub controller 33 starts operating. Immediately after the start of the operation, in step S12, the USB/hub controller 33 sets the keyboard enabling control signal 38 at the low level, so that the keyboard device 31 is put in a disable state. Accordingly, the keyboard device 31 cannot function until being put in an enable state. In step S22, the PC 10 recognizes the connection made in step S21, and the hub driver 27 installed in the OS 11 starts operating so as to set a hub configuration. In step S13, a hub configuration is also set in the USB device 30, so that the hub of the USB/hub controller 33 and the hub device 34 start functioning.

In step S14, the hub device 34, which has started operating, detects a currently connected device (or a function) in accordance with the hub stipulation in the standard USB specification. At this point, the storage device 32 is in an enable state, and the keyboard device 31 is in a disable state. Accordingly, the hub device 34 detects that the storage device 32 is the currently connected peripheral device. In step S23, the USB host controller 14 of the PC 10 detects that the storage device 32 is connected to the USB cable 18. In step S24, the configuration of the storage device 32 is established with the storage device driver 13 installed in the OS 11. In step S25, the storage device is mounted as a peripheral device for the PC 10. Accordingly, the storage device 32 provides a new disk drive on the PC 10.

In step S15, the USB/hub controller 33 of the USB device 30 determines whether the storage device 32 has started operating. When the mounting of the storage device 32 is completed in step S25, the determination result of step S15 becomes "YES". In step S16, the hub device 34, which has received the determination result of "YES", switches the keyboard enabling control signal 38 from the low level to the high level, so that the keyboard device 31 is switched from a disable state to an enable state. Thus, the keyboard device 31 starts operating. In step S17, the keyboard device 31 is connected to the USB cable 18 via the hub port 35 and the USB/hub controller 33.

In step S26, the USB host controller 14 of the PC 10 detects the connection of an unknown keyboard. The USB host controller 14 then reads a descriptor, which is the information showing the characteristics of the keyboard device 31, from the keyboard device 31, and transfers the information to the OS 11. The OS 11 specifies the driver of the keyboard device 31, and checks whether the driver is stored in a storage device such as a HDD in the PC 10. In this embodiment, the PC 10 is not provided with a keyboard driver. Therefore, the OS 11 accesses the storage device 32 that is recognized as an external disk drive. The storage device 32 holds the driver of the keyboard device 31. In step S27, the OS 11 reads the driver from the storage device 32, and installs the driver as the keyboard driver 12. In step S28, a keyboard configuration is established. In steps S18 and S29, the keyboard of the keyboard device 31 is put in an operating state. Thus, in steps S19 and S30, the USB device 30 is put in an operation state, being able to provide the disk drive function and keyboard function.

As described above, in accordance with the first embodiment of the present invention, the storage device 32 that can be recognized on the USB interface is installed as well as the keyboard device 31 in the USB device 30. When the USB device 30 is connected, the hub device 34 (or a peripheral engine 65 described later) makes the driver readable, starting the operation of the storage device 32 first (i.e., putting the keyboard device 31 in a disable state). In other word, the hub device 34 makes the keyboard device 31 recognizable after the storage device 32 is recognized. With this structure, even if the keyboard driver 12 does not exist on the OS 11, a keyboard driver can be automatically incorporated into the OS 11, without a CD-ROM device or a flexible magnetic disk device. Also, even if a CD-ROM device or a flexible magnetic disk device is provided, this structure does not need either of them in installing a keyboard driver in the OS 11. Accordingly, when a user installs a driver, all he/she has to do is to connect the USB device 30 to the PC 10 to start operating the USB device 30, with no regard to which storage unit the driver is stored in. Thus, the user can start a desired operation immediately after the single connecting action.

Figure 6:
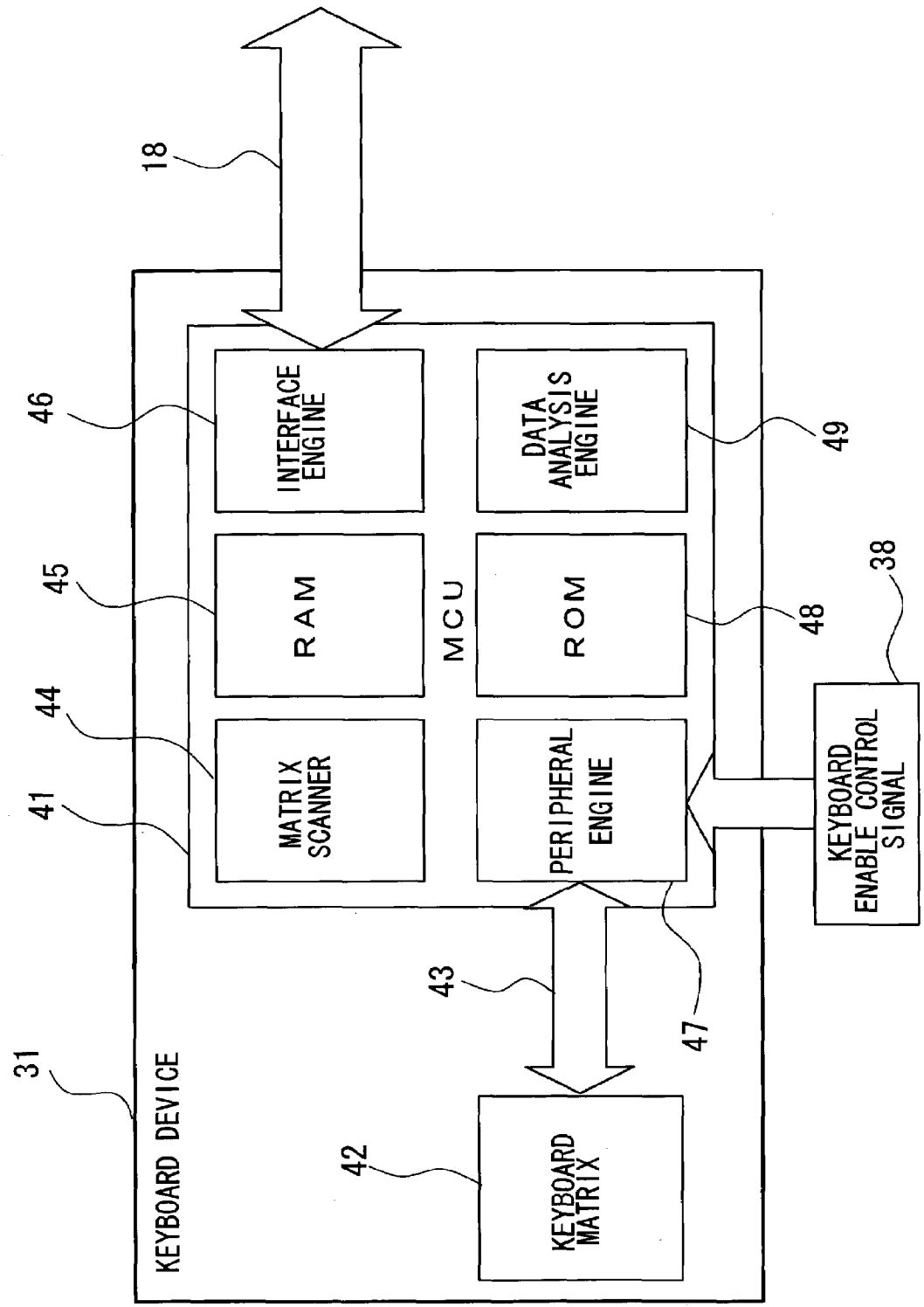
FIG. 6 is a block diagram of an example structure of the keyboard device shown in FIG. 4.

FIG. 6 is a block diagram of an example structure of the keyboard device 31. The keyboard device 31 is a function (a peripheral device) on a USB interface, and includes an MCU (Micro Control Unit) 41, a keyboard matrix 42, and a port 43 for connecting the MCU 41 and the keyboard matrix 42. The MCU 41 includes a matrix scanner 44, a RAM 45, an interface engine 46, a peripheral engine 47, a ROM 48, and a data analysis engine 49.

The keyboard matrix 42 is a mechanism containing a plurality of keys arranged in a matrix-like state. The matrix scanner 44 is the scan logic essential for the function of the keyboard, and scans the keyboard matrix 42 so as to check the ON/OFF state of each key. The keyboard matrix 42 is connected to the peripheral engine 47 via the port 43. A keyboard enabling control signal 38 is supplied from the hub device 34 to the peripheral engine 47 via a general-purpose input/output port or an external interrupt terminal. The keyboard enabling control signal 38 can have any form, as long as the MCU 41 can detect its level (the high or low level). When the level of the keyboard enabling control signal 38 is high, the keyboard device 31 is in an enable state, being able to operate. When the level of the keyboard enabling control signal 38 is low, the keyboard device 31 is in a disable state, being unable to operate. The data analysis engine 49 obtains key data from the matrix scanner 44 and the peripheral engine 47, and also checks the level of the keyboard enabling control signal 38 to determine whether an operation is allowed. In short, the data analysis engine 49 controls the entire MCU 41.

The interface engine 46 provides an interface for connecting the keyboard device 31 to the outside. The interface engine 46 monitors and controls the connection state, and also controls all transactions via an external bus interface (equivalent to the USB cable 18). When the level of the keyboard enabling control signal 38 is high, the data analysis engine 49 allows the interface engine 46 and the matrix scanner 44 to operate. When the level of the keyboard enabling control signal 38 is low, the data analysis engine 49 prohibits the interface engine 46 and the matrix scanner 44 from operating. To detect the level of the keyboard enabling control signal 38, the peripheral engine 47 is in operation even when the keyboard device 31 is in a disable state. The data analysis engine 49 receives the key state data from the matrix scanner 44 while allowing the interface engine 46 to operate, and outputs the key state data to the outside through the interface engine 46. The data analysis engine 49 also receives data from the outside through the interface engine 46, and performs suitable operations for the contents of the data. The matrix scanner 44, the data analysis engine 49, and the interface engine 46 operate on the ROM 48 or the RAM 45 in the MCU 41, or on a ROM or a RAM externally connected to the MCU 41. All the data required by the matrix scanner 44, the peripheral engine 47, and the data analysis engine 49 are stored in the ROM 48 or the RAM 45 in the MCU 41, or in a ROM or a RAM externally connected to the MCU 41.

Figure 7:
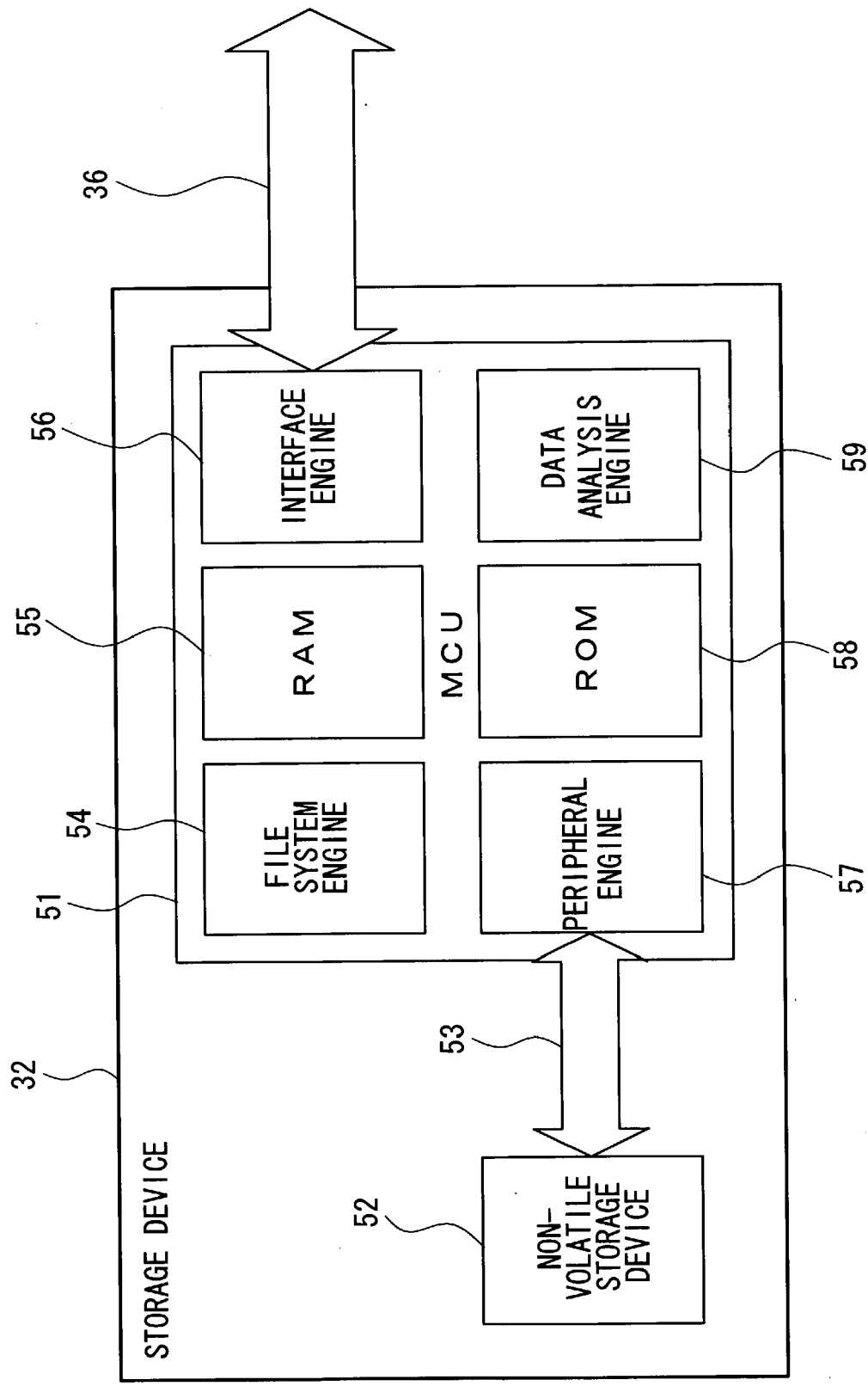
FIG. 7 is a block diagram of an example structure of the storage device shown in FIG. 4.

FIG. 7 is a block diagram of an example structure of the storage device 32. The storage device 32 is a function (a peripheral device) on the USB interface, and includes a MCU (Micro Control Unit) 51, a non-volatile storage unit 52, and a port 53 for connecting the MCU 51 and the non-volatile storage unit 52. The MCU 51 includes a file system engine 54, a RAM 55, an interface engine 56, a peripheral engine 57, a ROM 58, and a data analysis engine 59.

The non-volatile storage unit 52 is formed by a non-volatile memory, such as a flash ROM or FeRAM, and is controlled by the MCU 51. The driver of the keyboard device 31 is stored in the non-volatile storage unit 52. The non-volatile storage unit 52 is connected to the peripheral engine 57 in the MCU 51 via the port 53, and appears to be an externally connected RAM or ROM, or an internal RAM or ROM, seen from the side of the MCU 51. Regardless of the existence of the RAM 55 and the ROM 58 installed in the MCU 51, the non-volatile storage unit 52 operates as a valid disk drive for the external bus interface 18. Therefore, the file system engine 54, which manages the contents of the non-volatile storage unit 52 as files, is mounted on the MCU 51. There are various ways of managing the memory contents. In a case where a file located in the PC 10 is to be stored in the storage device 32, the non-volatile storage unit 52 manages information of: at which position in the memory of the storage device 32 the memory contents corresponding to the contents of the file should be recorded; at which position in the memory of the storage device 32, the information, which indicates that the recorded contents are the same as the contents of the file, such as the file name and the time stamp, should be recorded; and which recording means should be used for the recording. A request for reading and writing a file is issued to the interface engine 56 of the MCU 51 through the hub port 36. The data analysis engine 59 examines the contents of the request, and controls the file system engine 54 and the peripheral engine 57.

Figure 8:
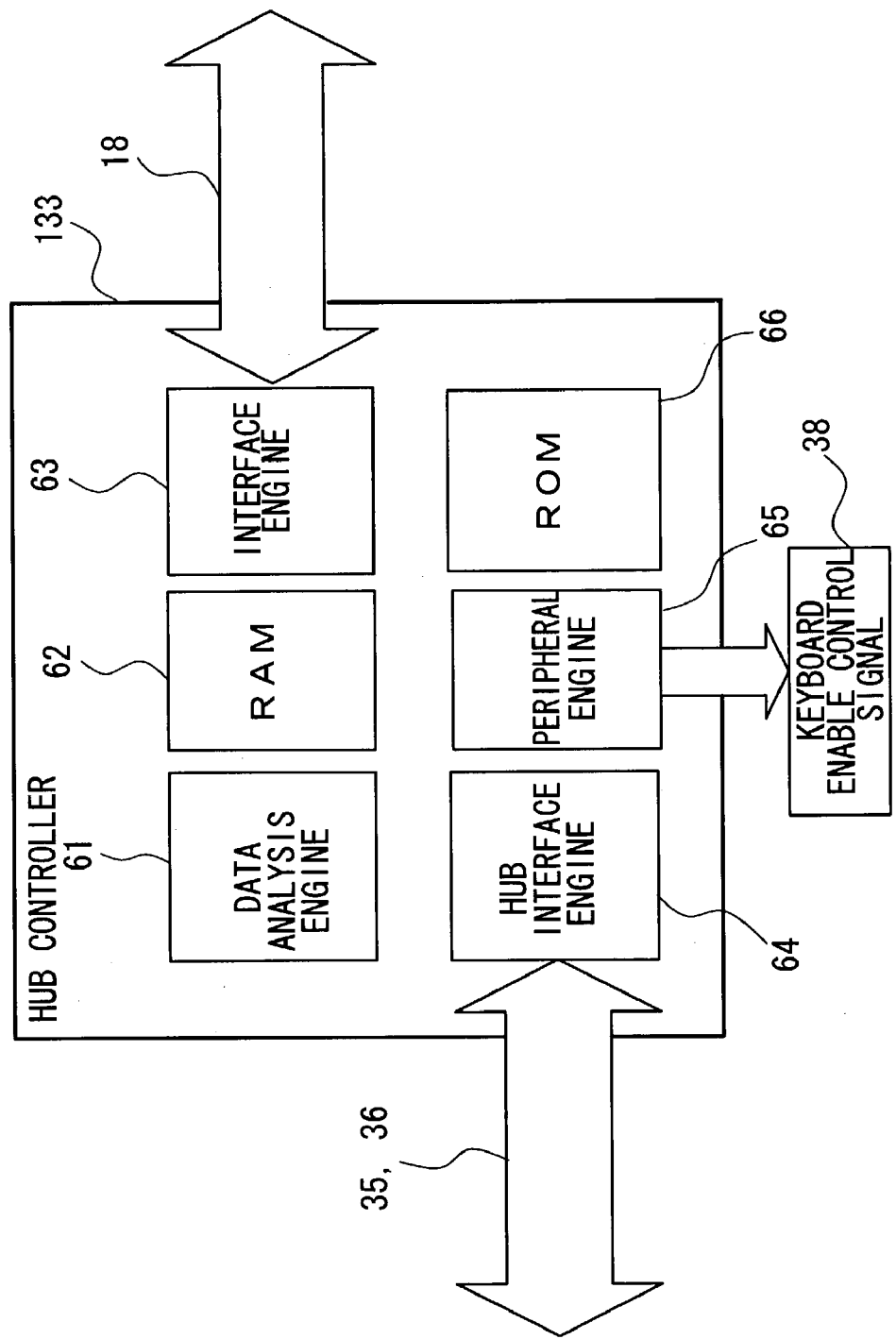
FIG. 8 is a block diagram of an example structure of a hub controller in the USB/hub controller shown in FIG. 4.

FIG. 8 is a block diagram of an example structure of a hub controller 133 of the USB/hub controller 33. The hub controller 133 includes a data analysis engine 61, a RAM 62, an interface engine 63, a hub interface engine 64, a peripheral engine 65, and a ROM 66. The hub device 34 of FIG. 4 is embodied in the peripheral engine 65.

The hub ports 35 and 36 are connected to the hub interface engine 64. The hub interface engine 64 performs the establishment of the hub configuration of step S13 in the flowchart of FIG. 5A. The USB cable 18 is connected to the interface engine 63. The data analysis engine 61 analyzes data and signals received via the hub ports 35 and 36 and the USB cable 18, and controls the entire hub controller 133. The peripheral engine 65 generates and outputs the keyboard enabling control signal 38 in accordance with an instruction from the data analysis engine 61. When the USB device 30 is connected in step S11 in the flowchart of FIG. 5A, the interface engine 63 notifies the data analysis engine 61 of the connection. Receiving the notice of the connection, the peripheral engine 65 sets the keyboard enabling control signal 38 at the low level. The RAM 62 functions as a work memory for each engine. The program and data of the operation of each engine are stored in the ROM 66.

(Second Embodiment)

Figure 9:
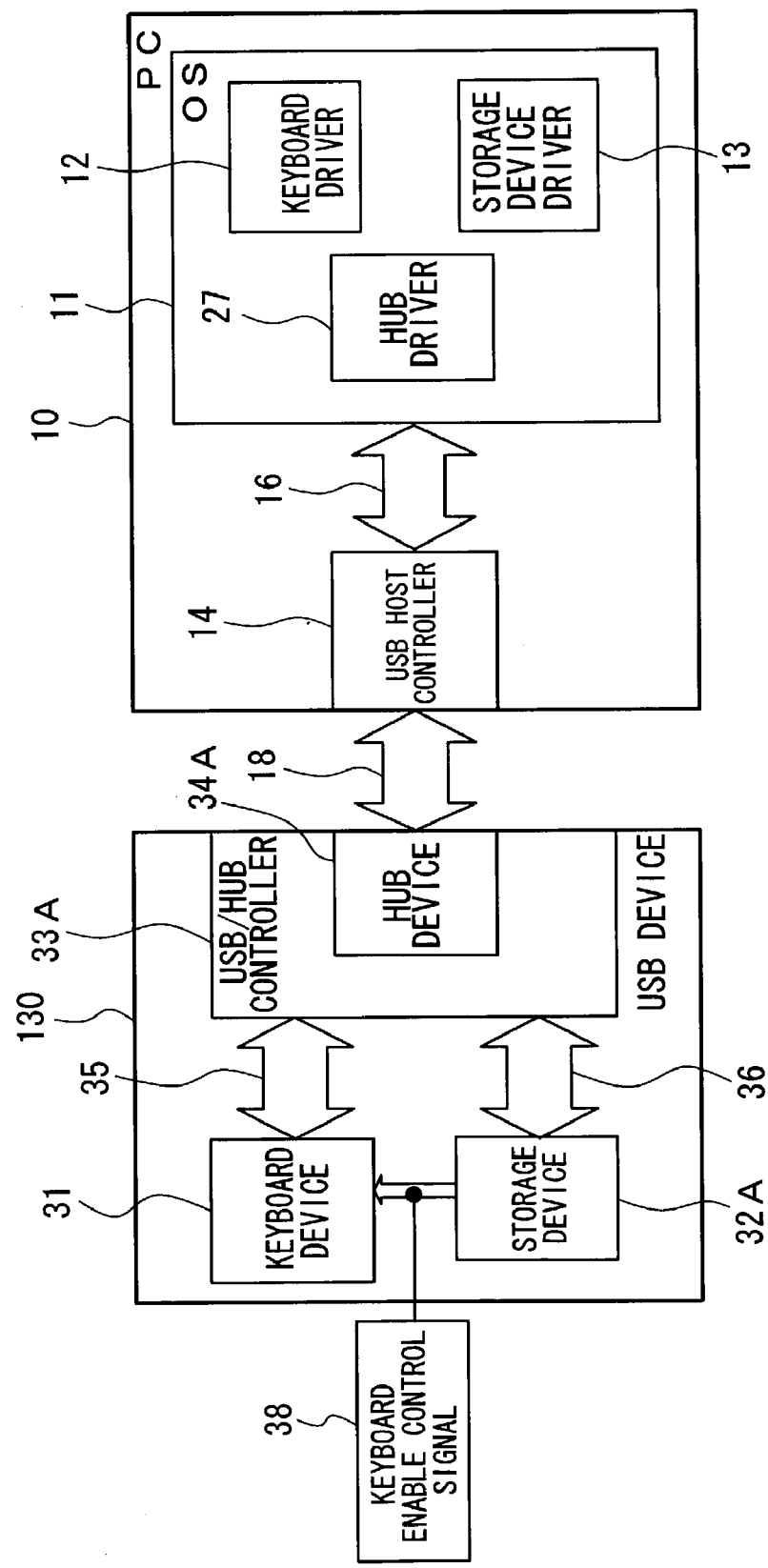
FIG. 9 is a block diagram of a structure according to a second embodiment of the present invention.

FIG. 9 illustrates a structure according to a second embodiment of the present invention. In this figure, the same components as the components of the first embodiment are denoted by like reference numerals. A USB device 130 is connected to a PC 10 via a USB cable 18. The USB device 130 differs from the above described USB device 30 in that a storage device 32A generates a keyboard enabling control signal 38, and outputs the signal 38 to a keyboard device 31. In other words, the control operations of steps S12 and S16 in the flowchart of FIG. 5A are performed by the storage device 32A. Accordingly, a hub device 34A installed in a USB/hub controller 33A does not have a function to generate the keyboard enabling control signal 38, and therefore can be a general-purpose hub.

Figure 10:
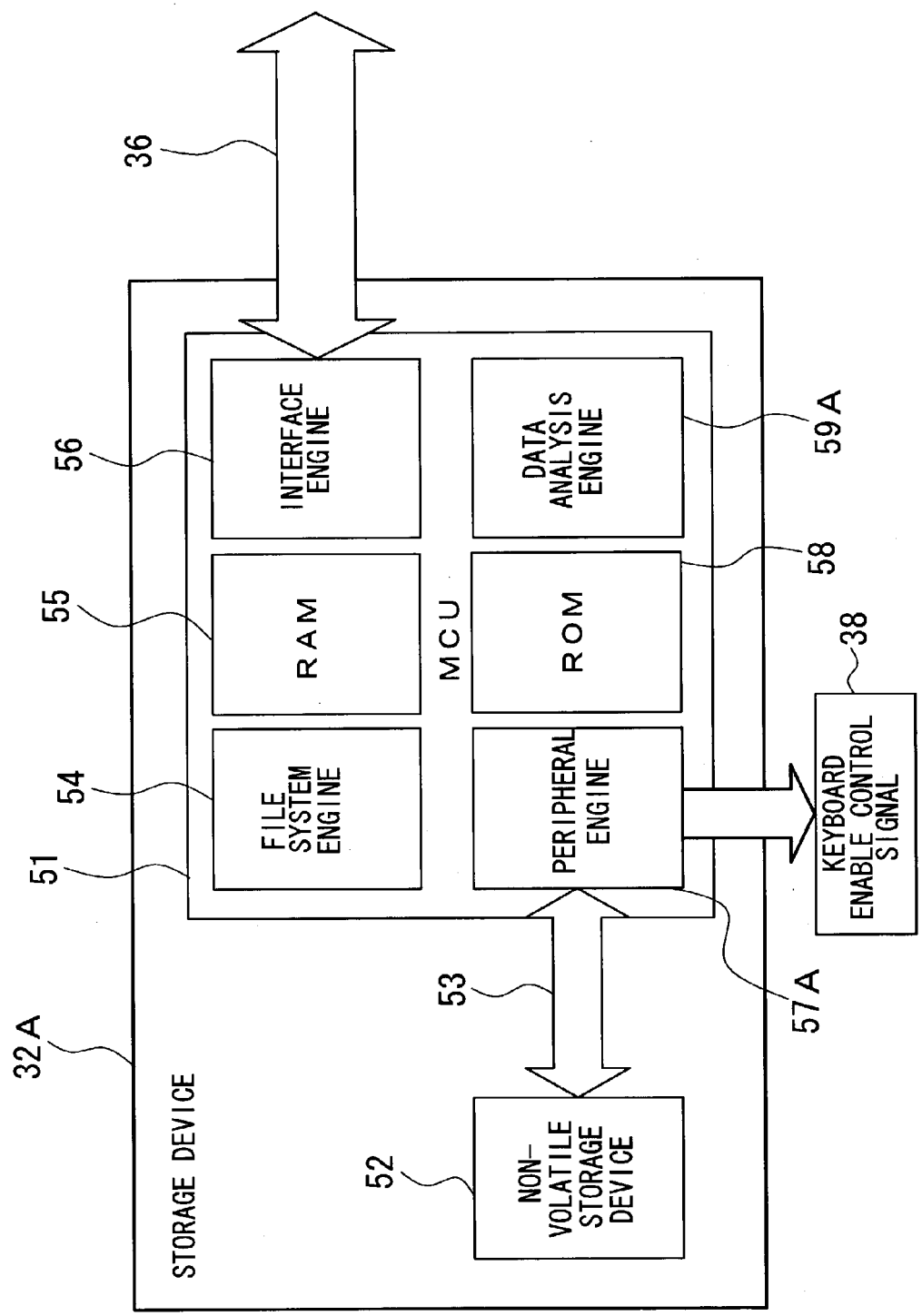
FIG. 10 is a block diagram of an example structure of the storage device shown in FIG. 9.

FIG. 10 is a block diagram of an example structure of the storage device 32A. In this figure, the same components as the components shown in FIG. 7 are denoted by like reference numerals. The storage device 32A is provided with a peripheral engine 57A having a function of generating the keyboard enabling control signal 38 in addition to the structure of the peripheral engine 57 shown in FIG. 7. A data analysis engine 59A also differs from the data analysis engine 59 shown in FIG. 7.

The data analysis engine 59A determines whether the storage device 32A has started operating as a storage device on the external bus interface 18. After confirming that the storage device 32A has started operating as a storage device, the data analysis engine 59A controls the peripheral engine 57A to handle the keyboard enabling control signal 38.

Figure 11:
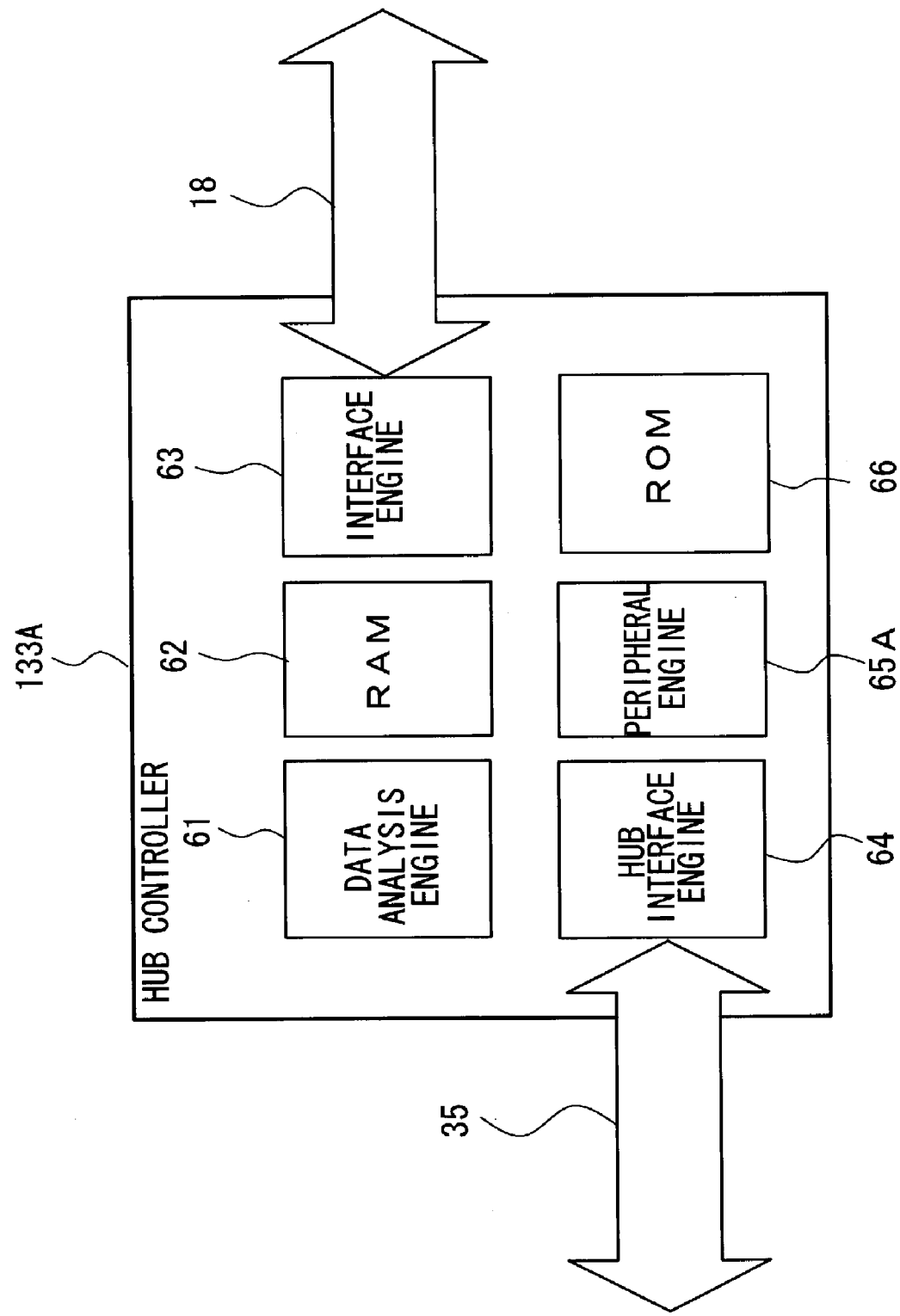
FIG. 11 is a block diagram of an example structure of a hub controller in the USB/hub controller shown in FIG. 9.

FIG. 11 is a block diagram of an example structure of a hub controller 133A of the USB/hub controller 33A shown in FIG. 9. In this figure, the same components as the components shown in FIG. 8 are denoted by like reference numerals. A peripheral engine 65A shown in FIG. 11 differs from the peripheral engine 65 shown in FIG. 8 in not having a function to generate the keyboard enabling control signal 38.

As described above, according to the second embodiment of the present invention, the storage device 32A that can be recognized as well as the keyboard device 31 on a USB interface is provided in the USB device 130. When the USB device 130 is connected, the peripheral engine 57A installed in the storage device 32A first starts the operation of the storage device 32A, so that the driver becomes readable. Even if the keyboard driver 12 does not exist in the OS 11, a keyboard driver can be automatically incorporated into the OS 11, without a CD-ROM device or a flexible magnetic disk device. Also, even if a CD-ROM device or a flexible magnetic disk device is provided, this structure does not need either of them in installing a keyboard driver in the OS 11. Accordingly, when a user installs a driver, all he/she has to do is to connect the USB device 130 to the PC 10 to start using the USB device 130, with no regard to which storage unit the driver is stored in. Thus, the user can start a desired operation immediately after the single connecting action.

(Third Embodiment)

Figure 12:
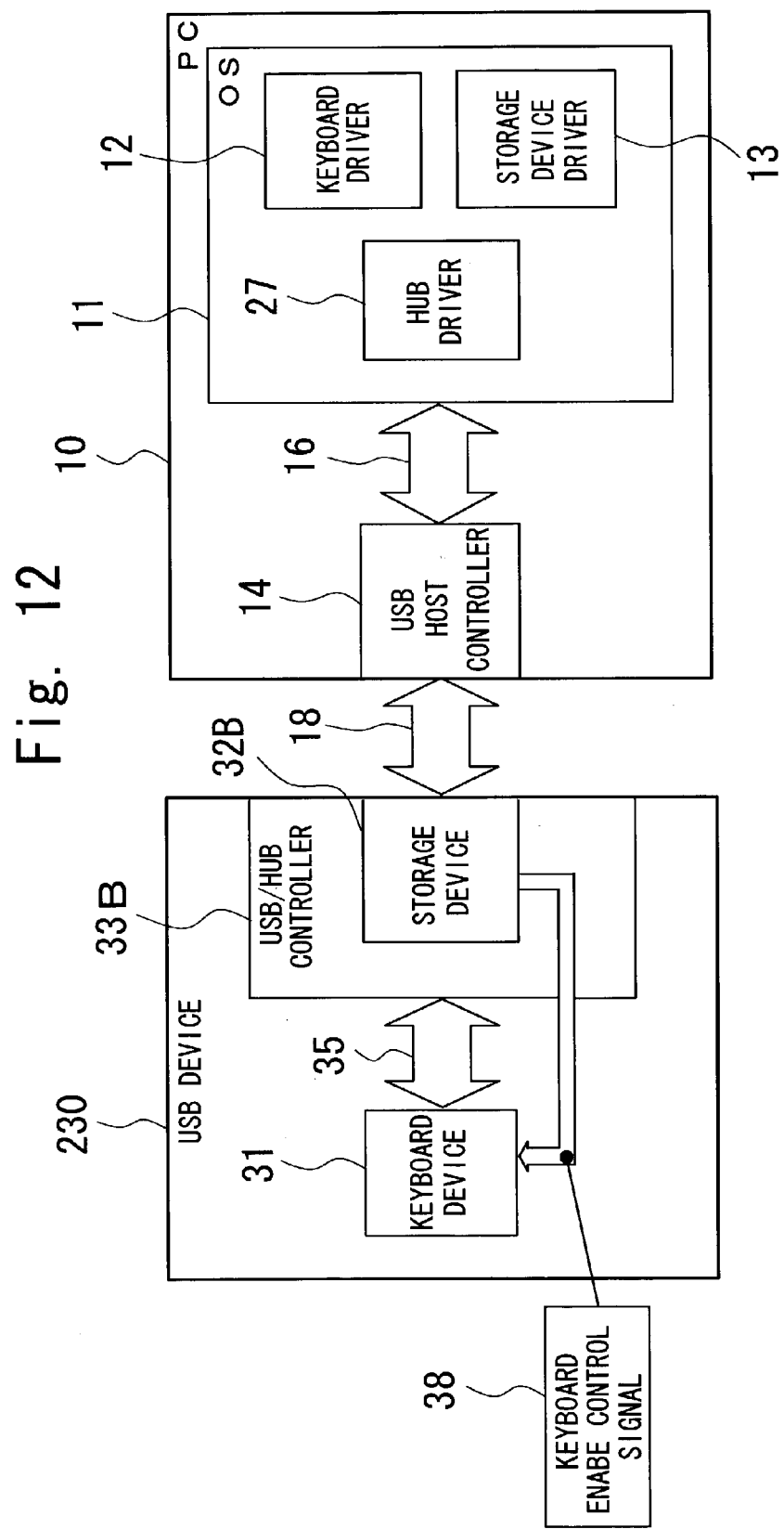
FIG. 12 is a block diagram of a structure according to a third embodiment of the present invention.

FIG. 12 illustrates a structure according to a third embodiment of the present invention. In this figure, the same components as the components of the foregoing embodiments are denoted by like reference numerals. A USB device 230 is connected to a PC 10 via a USB cable 18. The USB device 230 differs from the USB device 130 of the second embodiment in that a storage device 32B provided with a function to generate a keyboard enabling control signal 38 is installed in a USB/hub controller 33B. In other words, a storage function is formed as an internal function of a hub controller that can be recognized on a USB. The storage device 32B generates and outputs the keyboard enabling control signal 38 to a keyboard device 31 via a dedicated signal line.

Figure 13:
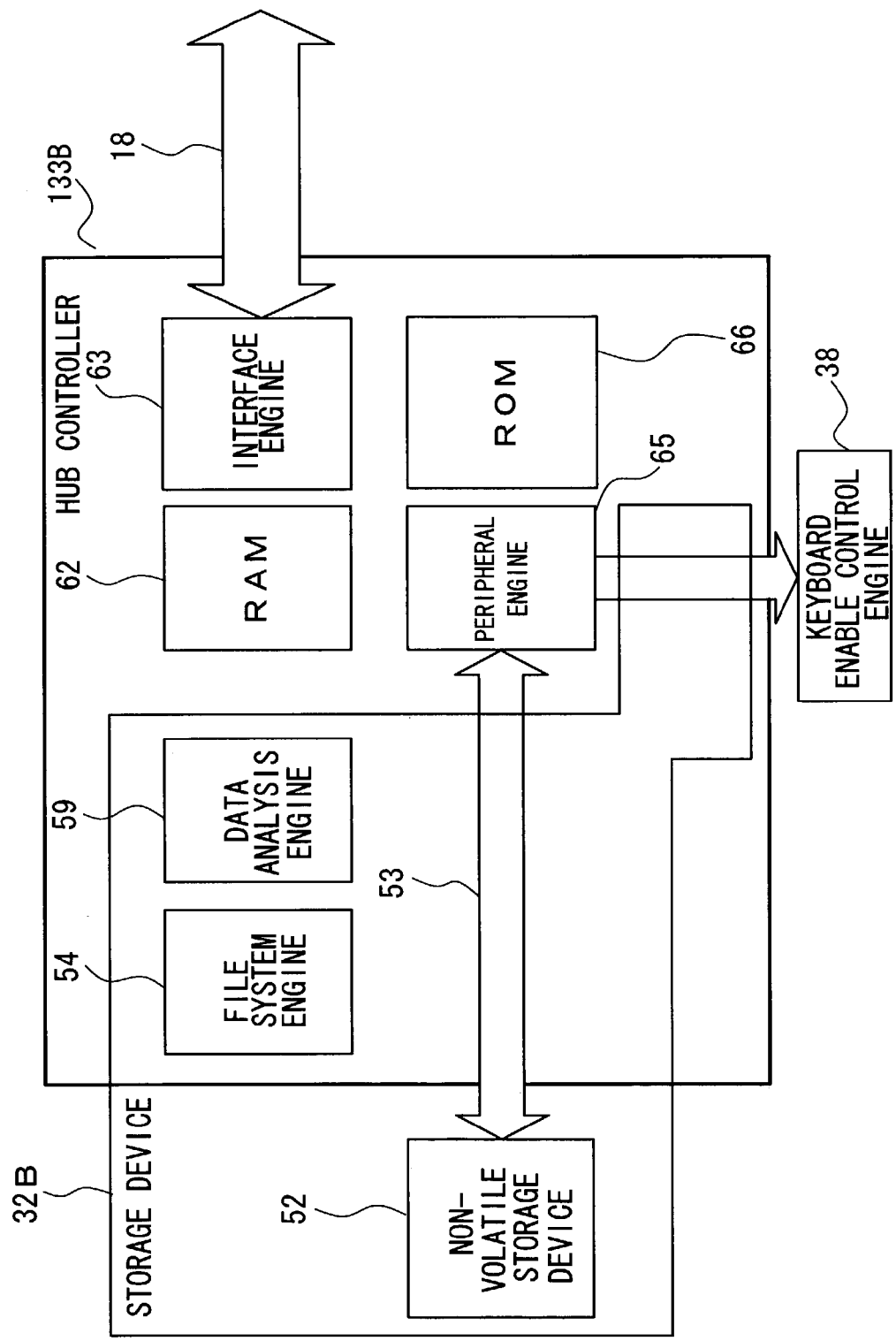
FIG. 13 is a block diagram of an example structure of the storage device and a hub controller in the USB/hub controller shown in FIG. 12.

FIG. 13 is a block diagram of an example structure of a hub controller 133B in the storage device 32B and the USB/hub controller 33B. In this figure, the same components as the components of the foregoing embodiments are denoted by like reference numerals. As shown in FIG. 13, the storage device 32B and the hub controller 133B shares a data analysis engine 59. By doing so, the storage device 32B is incorporated into the hub controller 133B. In the first embodiment of the present invention, the configuration state of the hub port 36 to which the storage device 32 is connected is read from the hub controller 133 so as to control the keyboard enabling control signal 38. On the other hand, the storage device 32B shown in FIG. 13 is configured, and, after a start of an operation as a storage device, i.e., a disk drive, is detected, the peripheral engine 65 of the hub controller 133B is operated to output the keyboard enabling control signal 38 to the keyboard device 31. In this manner, the storage device 32B functions as a peripheral device that operates within the hub controller 133B.

As described above, in accordance with the third embodiment of the present invention, the storage device 32B that can be recognized as well as the keyboard device 31 on a USB interface is provided in the USB device 230. When the USB device 230 is connected, the peripheral engine 65 installed in the USB/hub controller 33B first starts the operation of the storage device 32B, so that the driver becomes readable. Even if the keyboard driver 12 does not exist in the OS 11, a keyboard driver can be automatically incorporated into the OS 11, without a CD-ROM device or a flexible magnetic disk device. Also, even if a CD-ROM device or a flexible magnetic disk device is provided, this structure does not need either of them in installing a keyboard driver in the OS 11. Accordingly, when a user installs a driver, all he/she has to do is to connect the USB device 230 to the PC 10 to start using the USB device 230, with no regard to which storage unit the driver is stored in. Thus, the user can start a desired operation immediately after the single connecting action.

(Fourth Embodiment)

Figure 14:
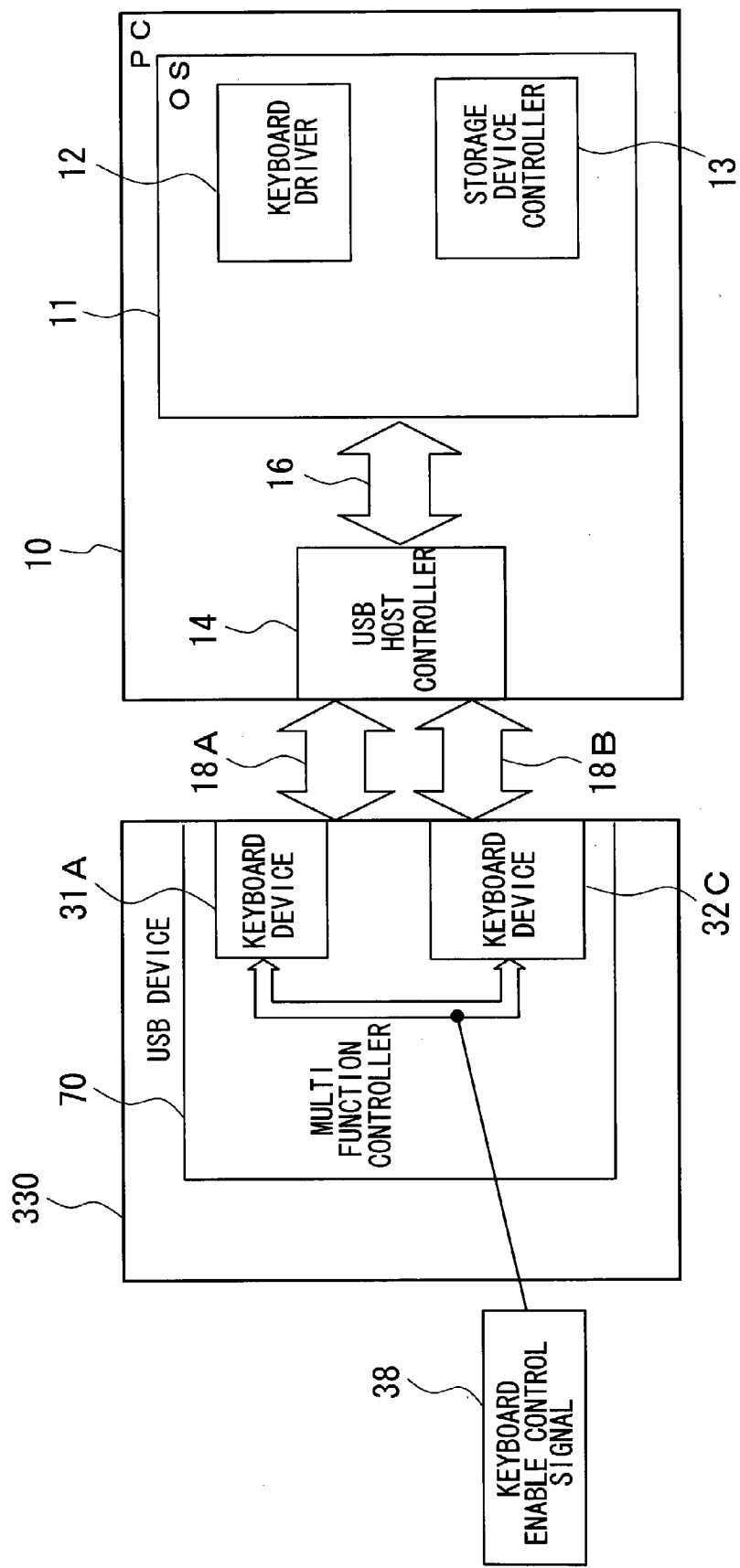
FIG. 14 is a block diagram of a structure according to a fourth embodiment of the present invention.

FIG. 14 illustrates a structure according to a fourth embodiment of the present invention. In this figure, the same components as the components of the foregoing embodiments are denoted by like reference numerals. A USB device 330 includes a multi function controller 70. The multi function controller 70 further includes a keyboard device 31A and a storage device 32C. Accordingly, the keyboard device 31A and the storage device 32C exist as a physical device in the multi function controller 70. The keyboard device 31A is connected to a USB host controller 14 via a USB cable 18A, and the storage device 32C is connected to the USB host controller 14 via a USB cable 18B. The storage device 32C outputs a keyboard enabling control signal 38 to the keyboard device 31A.

Figure 15:
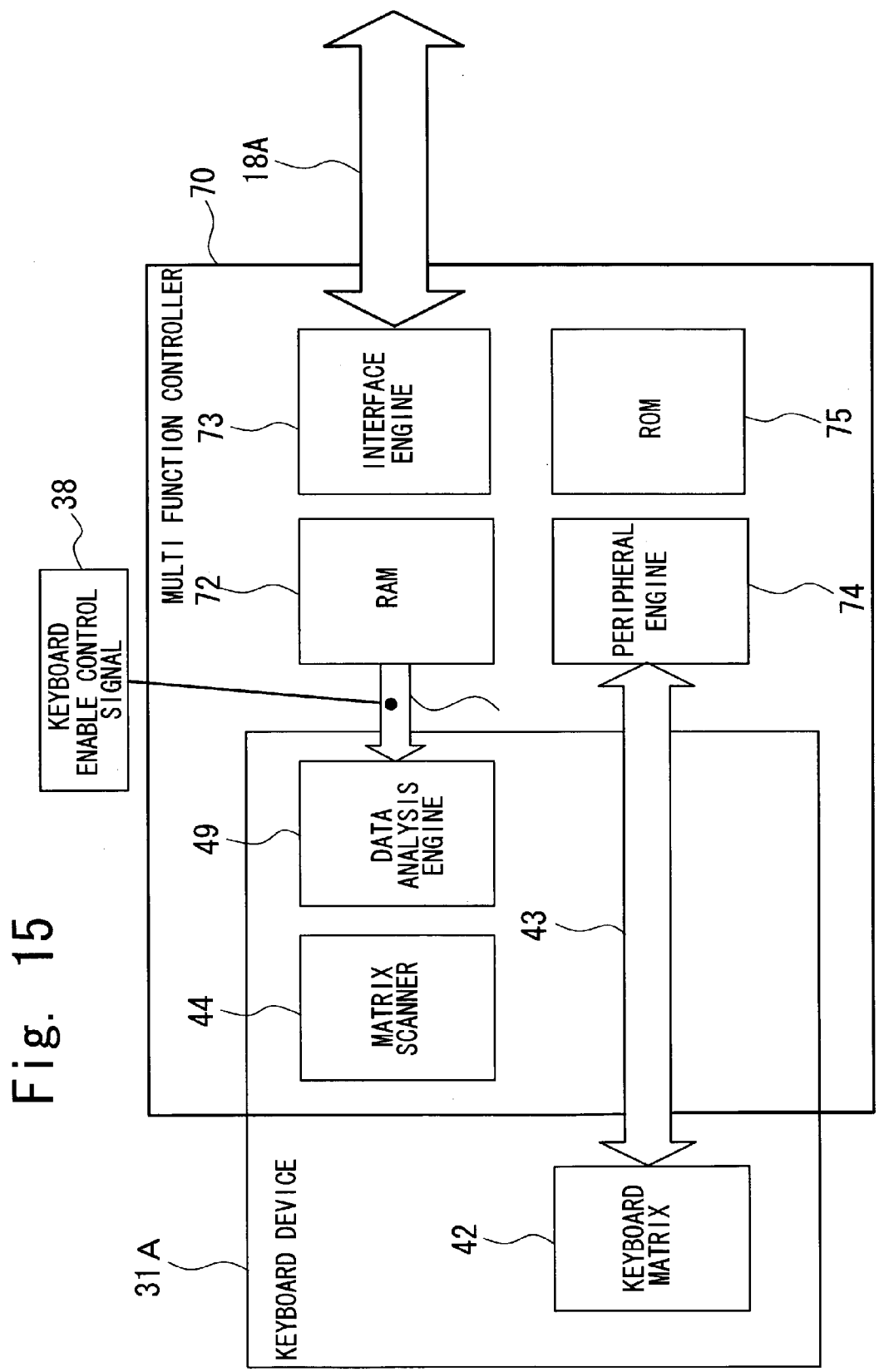
FIG. 15 is a block diagram of an example structure of the keyboard device shown in FIG. 14.

FIG. 15 is a block diagram of an example structure of the keyboard device 31A. In this figure, the same components as the components of the foregoing embodiments are denoted by like reference numerals. The keyboard device 31A includes a keyboard matrix 42, a matrix scanner 44, and a data analysis engine 49. The multi function controller 70 includes a RAM 72, an interface engine 73, a peripheral engine 74, and a ROM 75. These components also serve as the components of the keyboard device 31A, and, as a whole, the same structure and functions as the keyboard device 31 shown in FIG. 6 are embodied in this structure. In the structure of the keyboard device 31 shown in FIG. 6, the keyboard enabling control signal 38 is provided by hardware connection of a signal line. On the other hand, in the keyboard device 31A shown in FIG. 15, the keyboard enabling control signal 38 is a memory status developed in the RAM 72. This memory status is formed by one bit, and is stored at a predetermined address. Such a memory status is handled by the storage device 32C. The keyboard device 31A checks the memory status in the RAM 72 so as to switch to an enable state or a disable state. The RAM 72, the interface engine 73, the peripheral engine 74, and the ROM 75 are the same as the corresponding components shown in FIG. 6.

Figure 16:
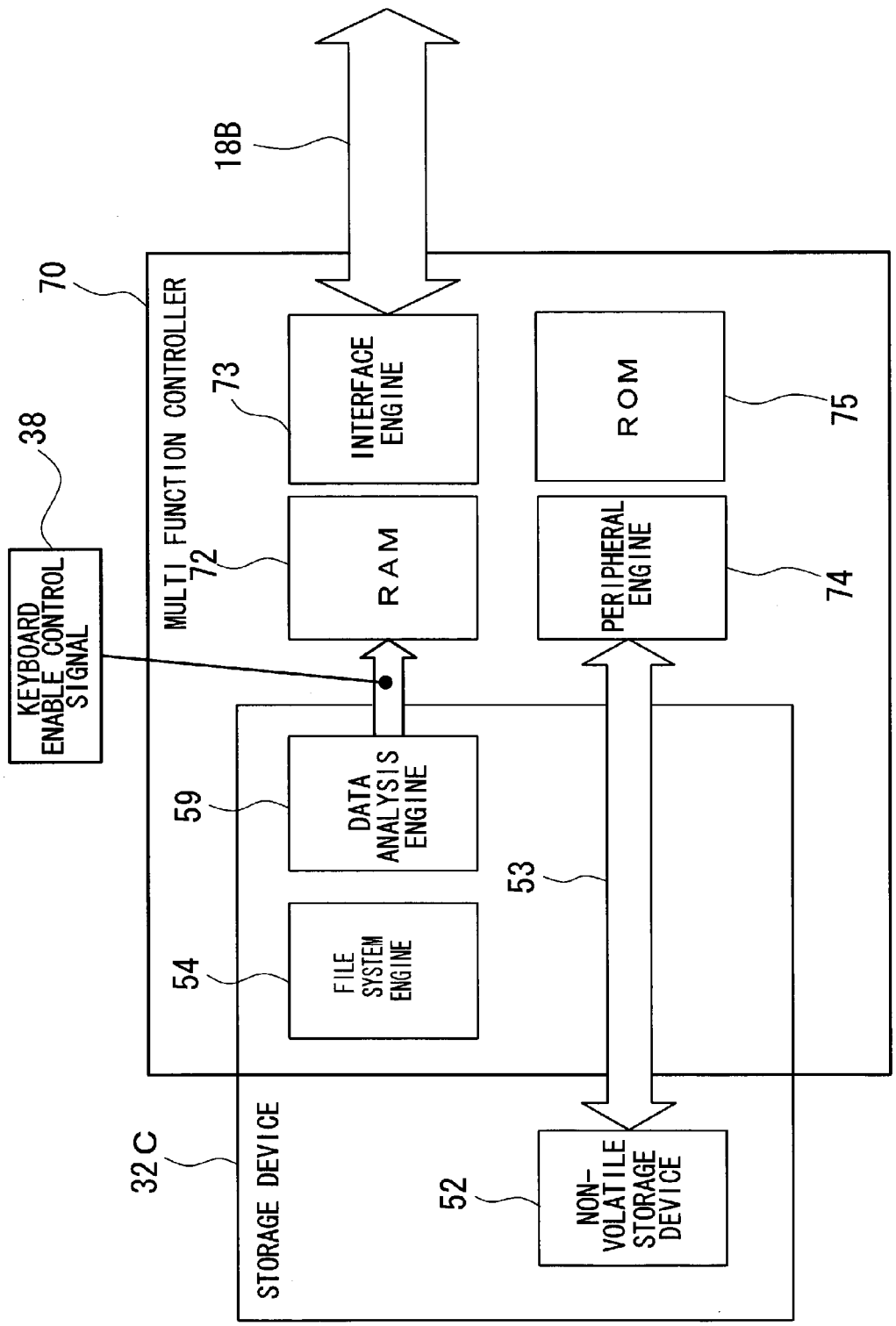
FIG. 16 is a block diagram of an example structure of the storage device shown in FIG. 14.

FIG. 16 is a block diagram of an example structure of the storage device 32C. In this figure, the same components as the components of the foregoing embodiments are denoted by like reference numerals. The storage device 32C includes a non-volatile storage unit 52, a file system engine 54, and a data analysis engine 59. The RAM 72, the interface engine 73, the peripheral engine 74, and the ROM 75 of the multi function controller 70 also serve as components of the storage device 32C. In other words, these components 72 through 75 are shared between the keyboard device 31A and the storage device 32C. The functions of the storage device 32C are the same as the functions of the storage device 32B shown in FIG. 13. However, the keyboard enabling control signal 38 is determined by setting the level of the port of the keyboard device 31 at the high or low level in the structure shown in FIG. 13. In the structure shown in FIG. 16, on the other hand, the data analysis engine 59 writes "1" or "0" in the 1-bit memory state in the RAM 72. When starting an operation as a disk drive, the storage device 32C writes "1" in the RAM 72. The data analysis engine 49 of the keyboard device 31A reads the 1 bit of the memory status, and switches the keyboard device 31A to an enable state.

As described above, in accordance with the fourth embodiment of the present invention, the storage device 32C that can be recognized as well as the keyboard device 31A on a USB interface is provided in the multi function controller. When the USB device 330 is connected, the predetermined memory status in the RAM 72 provided in the multi function controller 70 is defined as a means to start the operation of the storage device 32C so as to make the driver readable. The memory status bit functions to delay the recognition of a device other than the storage device 32C by the hub, specifically, the recognition of the keyboard device 31A by the hub. Accordingly, even if the keyboard driver 12 does not exist in the OS 11, a keyboard driver can be automatically incorporated into the OS 11, without a CD-ROM device or a flexible magnetic disk device. Also, even if a CD-ROM device or a flexible magnetic disk device is provided, this structure does not need either of them in installing a keyboard driver in the OS 11. Accordingly, when a user installs a driver, all he/she has to do is to connect the USB device 330 to the PC 10 to start using the USB device 330, with no regard to which storage unit the driver is stored in. Thus, the user can start a desired operation immediately after the single connecting action.

Figure 17:
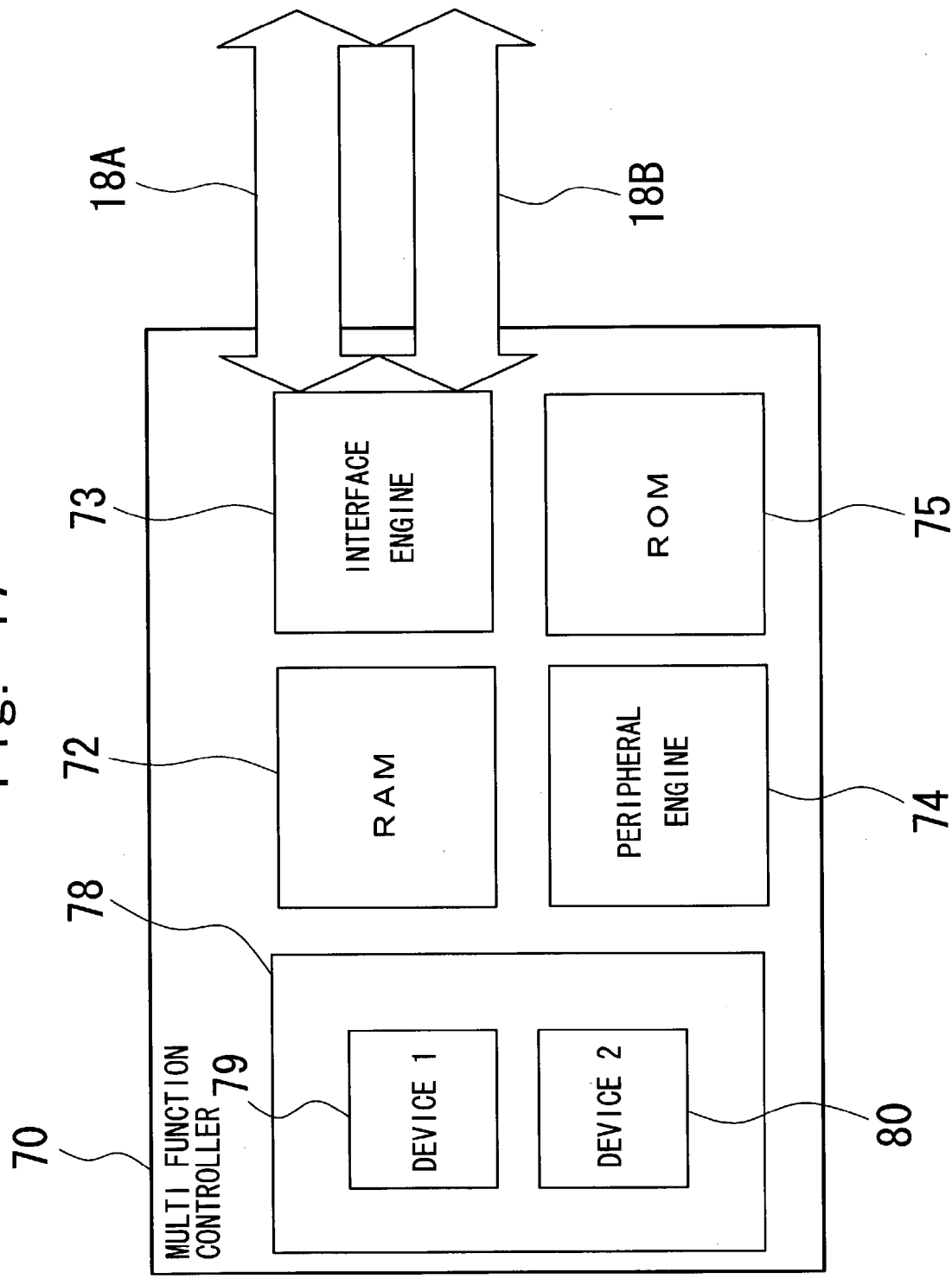
FIG. 17 is a block diagram of a structure that is the combination of the structures shown in FIGS. 15 and 16.

FIG. 17 illustrates a structure that sums up the structures shown in FIGS. 15 and 16. A device 1 denoted by reference numeral 79 is equivalent to the keyboard device 31A, and a device 2 denoted by reference numeral 80 is equivalent to the storage device 32C.

(Fifth Embodiment)

Figure 18:
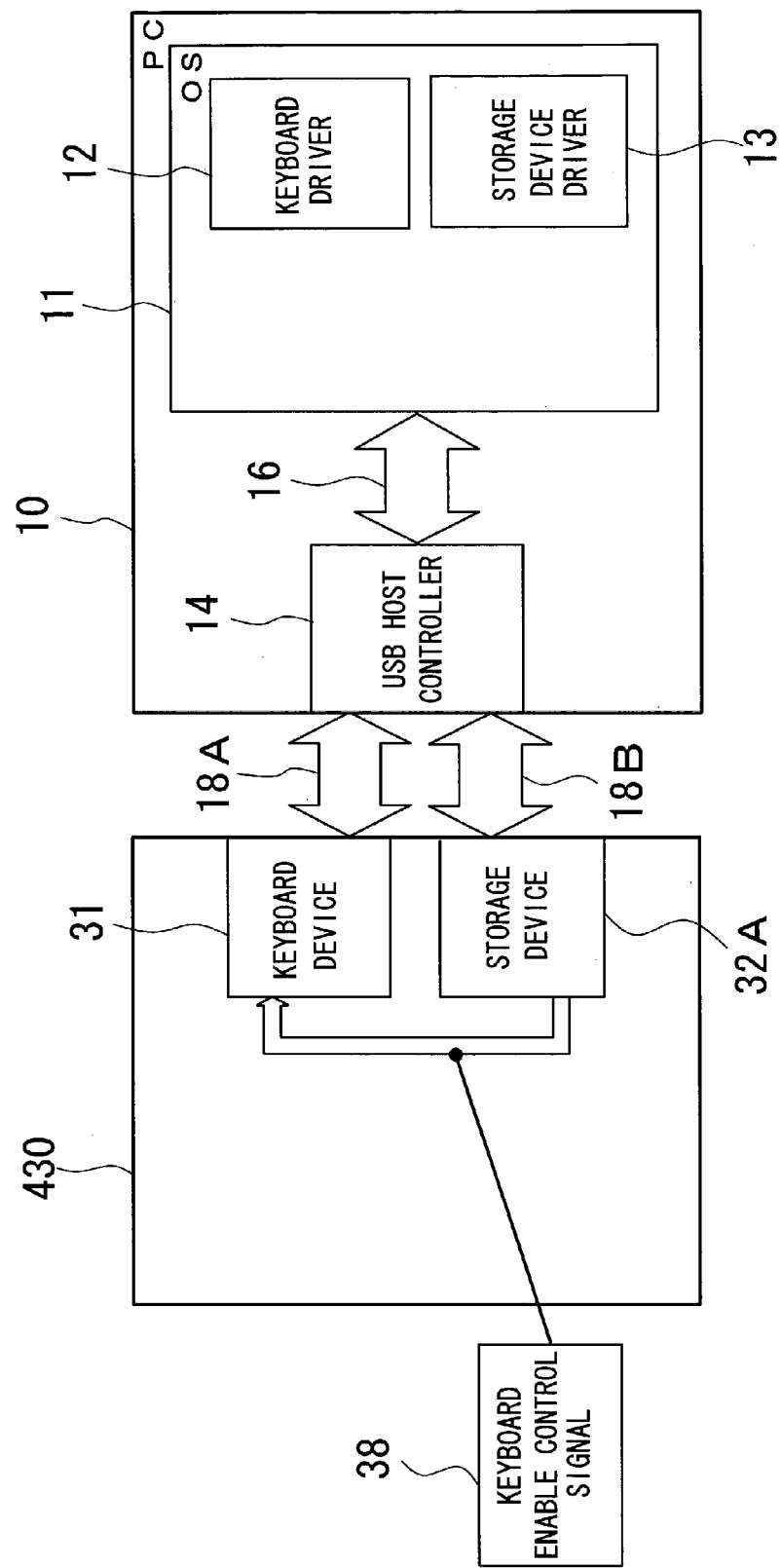
FIG. 18 is a block diagram of a structure according to a fifth embodiment of the present invention.

FIG. 18 illustrates a structure according to a fifth embodiment of the present invention. In this figure, the same components as the components of the foregoing embodiments are denoted by like reference numerals. A USB device 430 includes a keyboard device 31 and a storage device 32A. The keyboard device 31 and the storage device 32A exist as separate physical devices in the USB device 430. The USB device 430 is not provided with a hub function. The keyboard device 31 is connected to a USB host controller 14 via a USB cable 18A, and the storage device 32A is connected to the USB host controller 14 via a USB cable 18B. The storage device 32 outputs a keyboard enabling control signal 38 to the keyboard device 31. The keyboard device 31 has the same structure as the structure shown in FIG. 6, and the storage device 32A has the same structure as the structure shown in FIG. 10. The operations of the keyboard device 31 and the storage device 32A are also the same as the operations described with respect to the foregoing embodiments.

It should be noted that a hub driver of the USB device 430 is not incorporated into the OS 11 of the PC 10.

(Sixth Embodiment)

Figure 19:
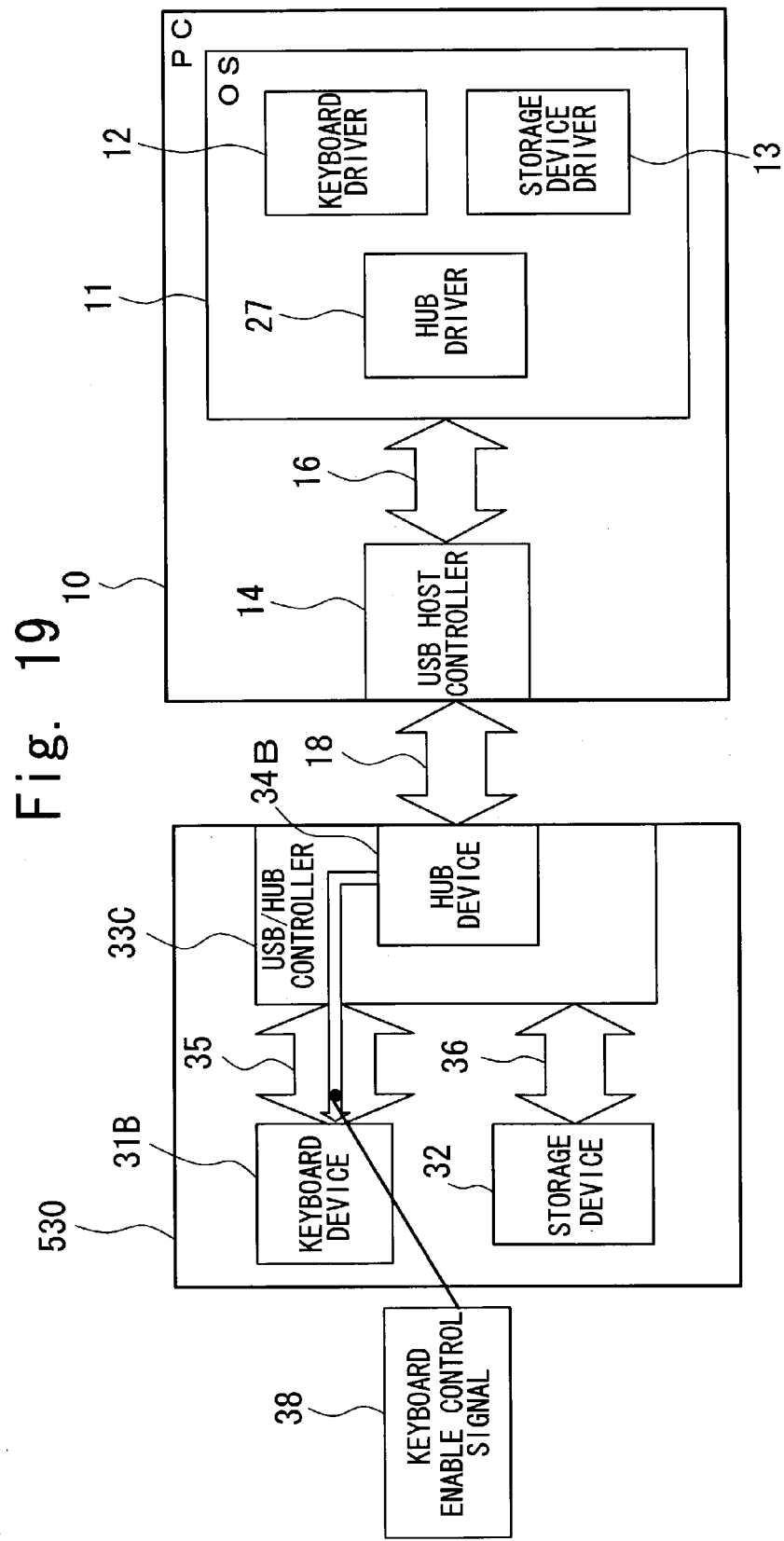
FIG. 19 is a block diagram of a structure according to a sixth embodiment of the present invention.

FIG. 19 illustrates a structure according to a sixth embodiment of the present invention. In this figure, the same components as the components of the foregoing embodiments are denoted by like reference numerals. A USB 530 is a modification of the USB device 30 shown in FIG. 4. In FIG. 4, the hub device 34 supplies the keyboard enabling control signal 38 to the keyboard device 31, using a signal line different from the hub port 35. In the structure shown in FIG. 19, on the other hand, a hub device 34B supplies the keyboard enabling control signal 38 to a keyboard device 31B through the hub port 35. This signal supply is performed by the hub device 34B maintaining the hub port 35 in the "reset state" specified in the standard USB specification.

Figure 20:
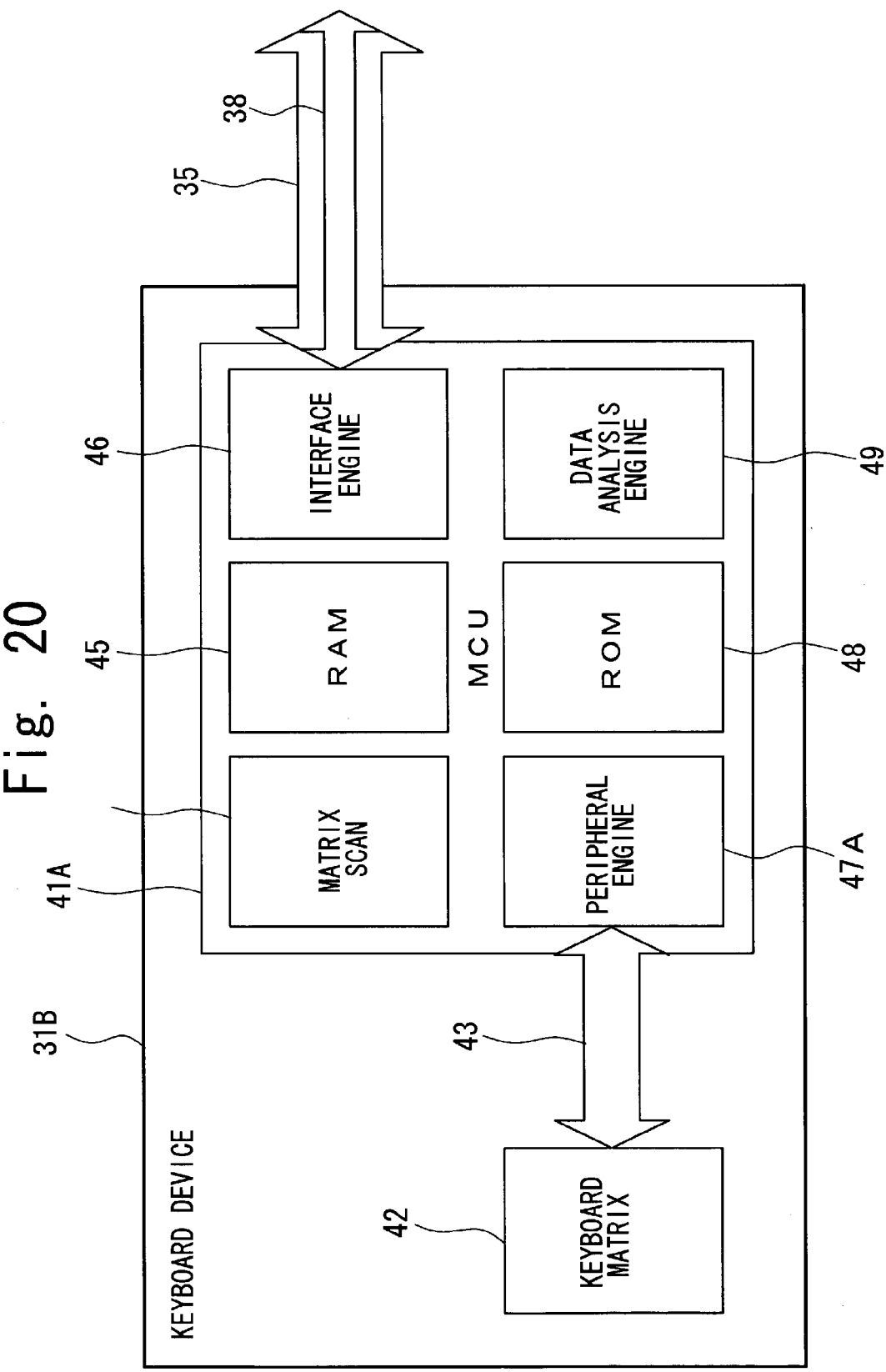
FIG. 20 is a block diagram of an example structure of the keyboard device shown in FIG. 19.

FIG. 20 is a block diagram of an example structure of the keyboard device 31B. In this figure, the same components as the components shown in FIG. 6 are denoted by like reference numerals. In the structure shown in FIG. 6, the peripheral engine 47 receives the keyboard enabling control signal 38 via a dedicated signal line. In the structure shown in FIG. 20, on the other hand, a peripheral engine 47A does not have such a function as to receive the keyboard enabling control signal 38. Instead, an interface engine 46 receives the keyboard enabling control signal 38 transmitted through the hub port 35.

Figure 21:
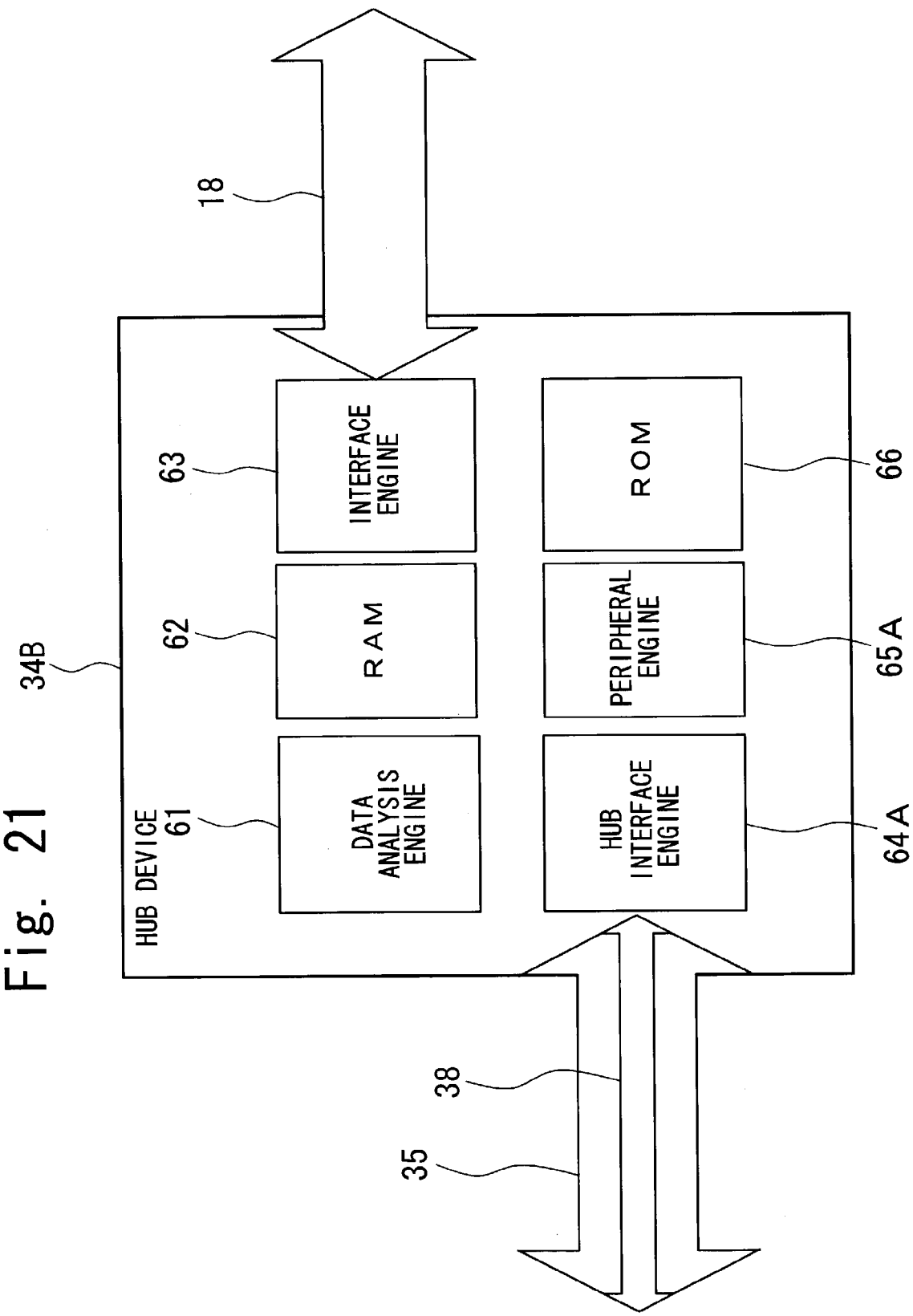
FIG. 21 is a block diagram of an example structure of a hub controller in the USB/hub controller shown in FIG. 19.

FIG. 21 is a block diagram of an example structure of the hub device 34B provided in a hub controller that constitutes a USB/hub controller 33C. In this figure, the same components as the components shown in FIG. 11 are denoted by like reference numerals. A hub interface engine 64A controls the hub port 35, and outputs the keyboard enabling control signal 38 to the keyboard device 31B.

As described above, in accordance with the sixth embodiment of the present invention, the storage device 32 that can be recognized as well as the keyboard device 31B on a USB interface is provided in the USB device 530. When the USB device 530 is connected, the hub interface engine 64A installed in the hub controller 133C starts the operation of the storage device 32 so as to make the driver readable. Even if the keyboard driver 12 does not exist in the OS 11, a keyboard driver can be automatically incorporated into the OS 11, without a CD-ROM device or a flexible magnetic disk device. Also, even if a CD-ROM device or a flexible magnetic disk device is provided, this structure does not need either of them in installing a keyboard driver in the OS 11. Accordingly, when a user installs a driver, all he/she has to do is to connect the USB device 530 to the PC 10 to start using the USB device 530, with no regard to which storage unit the driver is stored in. Thus, the user can start a desired operation immediately after the single connecting action.

(Seventh Embodiment)

Figure 22:
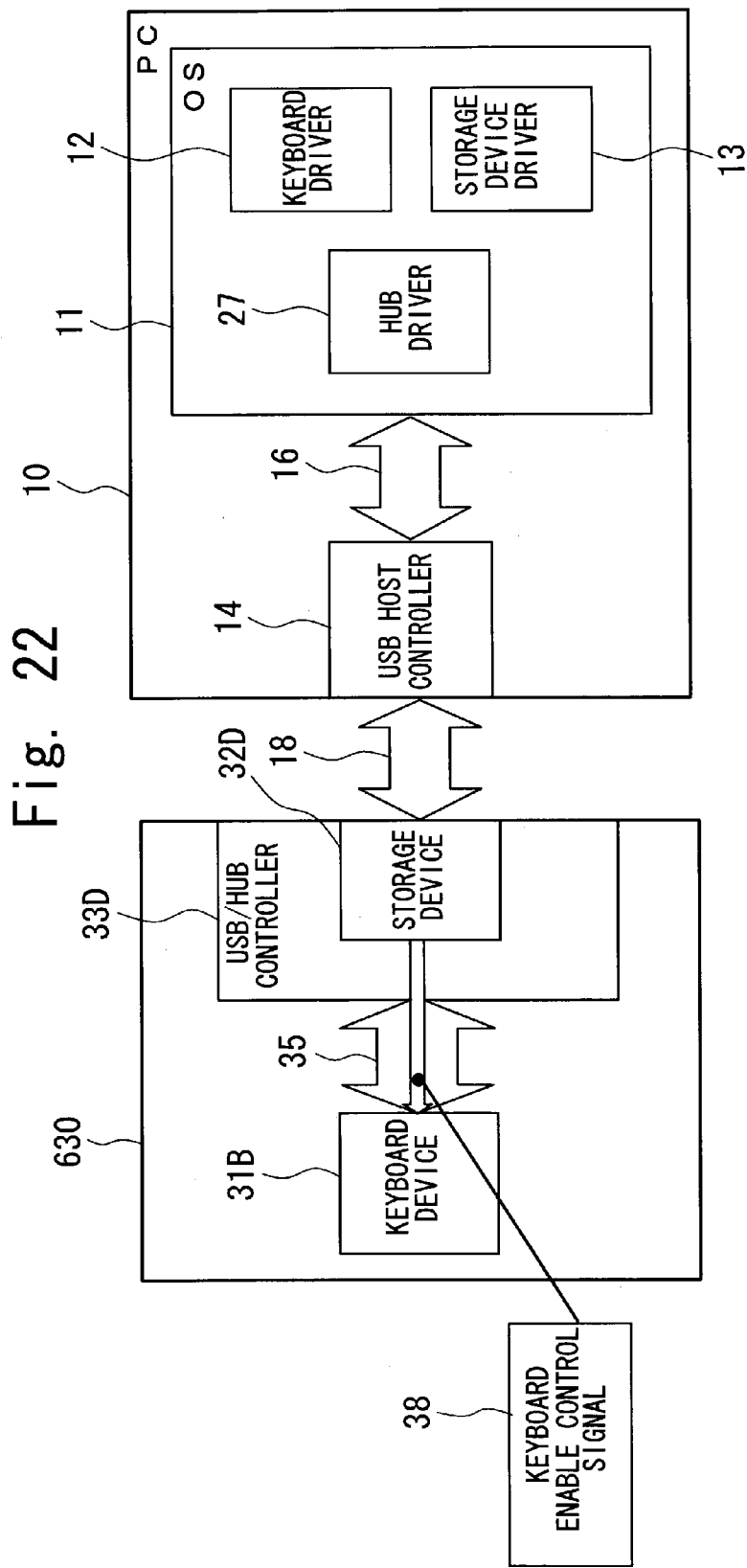
FIG. 22 is a block diagram of a structure according to a seventh embodiment of the present invention.

FIG. 22 is a block diagram of a structure according to a seventh embodiment of the present invention. In this figure, the same components as the components of the foregoing embodiments are denoted by like reference numerals. A USB device 630 is a modification of the USB device 230 shown in FIG. 12. In FIG. 12, the storage device 32B supplies the keyboard enabling control signal 38 to the keyboard device 31, using a dedicated signal line different from the hub port 35. In the structure shown in FIG. 22, on the other hand, a storage device 32D provided in a USB/hub controller 33D supplies the keyboard enabling control signal 38 to a keyboard device 31B through the hub port 35.

Figure 23:
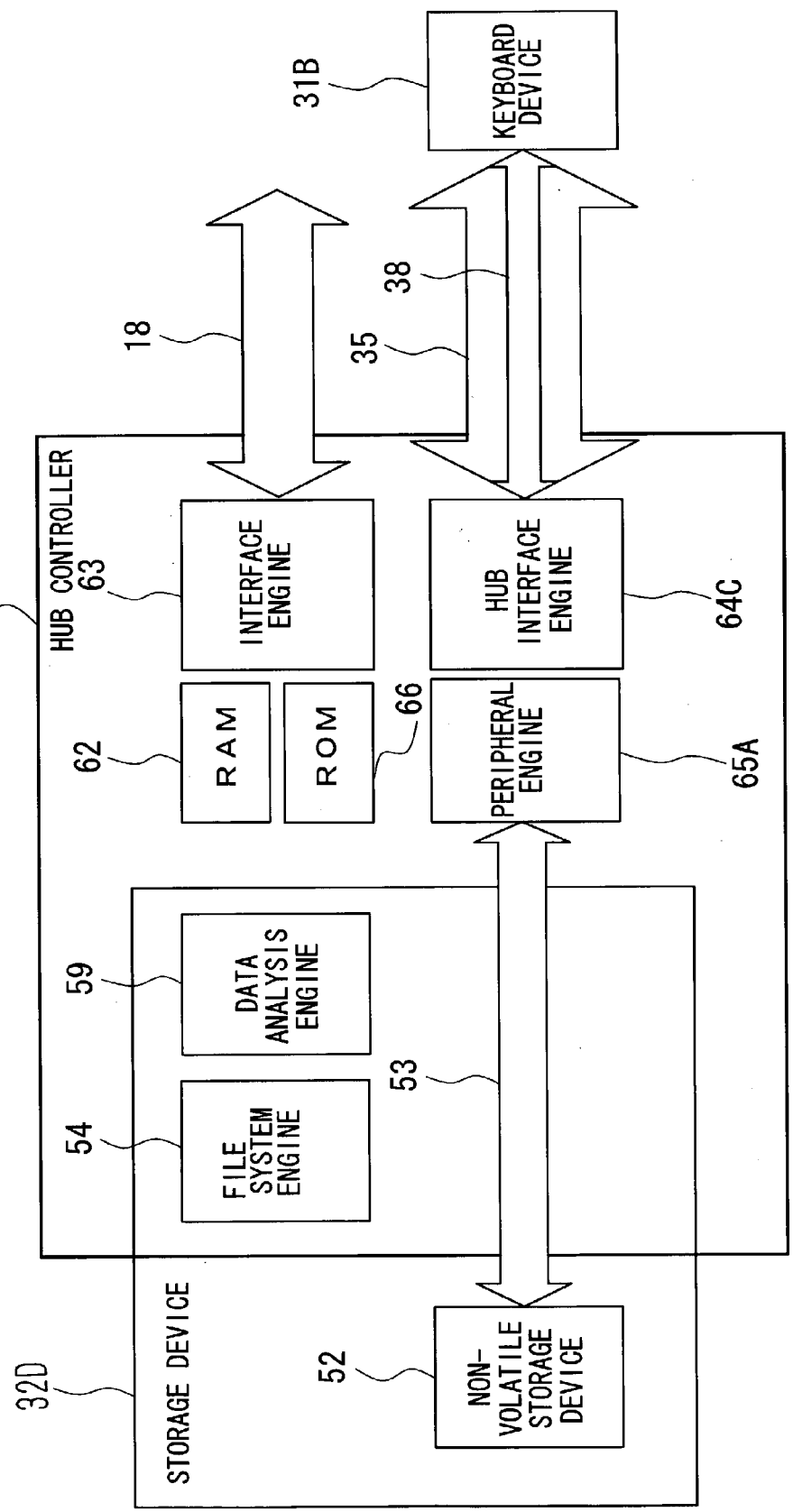
FIG. 23 is a block diagram of an example structure of the storage device and a hub controller in the USB/hub controller shown in FIG. 22.

FIG. 23 is a block diagram of an example structure of the storage device 32D and a hub controller 133D provided in the USB/hub controller 33D. In this figure, the same components as the components of the foregoing embodiments are denoted by like reference numerals. A hub interface engine 64C outputs the keyboard enabling control signal 38 to the keyboard device 31B through the hub port 35. Accordingly, a peripheral engine 65A in the hub controller 133D differs from the peripheral engine 65 shown in FIG. 13 in not having a function to output the keyboard enabling control signal 38. The storage device 32D includes a non-volatile storage unit 52, a file system engine 54, and a data analysis engine 59. The hub controller 133D shares its components with the storage device 32D.

As described above, in accordance with the seventh embodiment of the present invention, the storage device 32D that can be recognized as well as the keyboard device 31B on a USB interface is provided in the USB device 630. When the USB device 630 is connected, the hub interface engine 64C starts the operation of the storage device 32D so as to make the driver readable. Even if the keyboard driver 12 does not exist in the OS 11, a keyboard driver can be automatically incorporated into the OS 11, without a CD-ROM device or a flexible magnetic disk device. Also, even if a CD-ROM device or a flexible magnetic disk device is provided, this structure does not need either of them in installing a keyboard driver in the OS 11. Accordingly, when a user installs a driver, all he/she has to do is to connect the USB device 630 to the PC 10 to start using the USB device 630, with no regard to which storage unit the driver is stored in. Thus, the user can start a desired operation immediately after the single connecting action.

(Eighth Embodiment)

Figure 24:
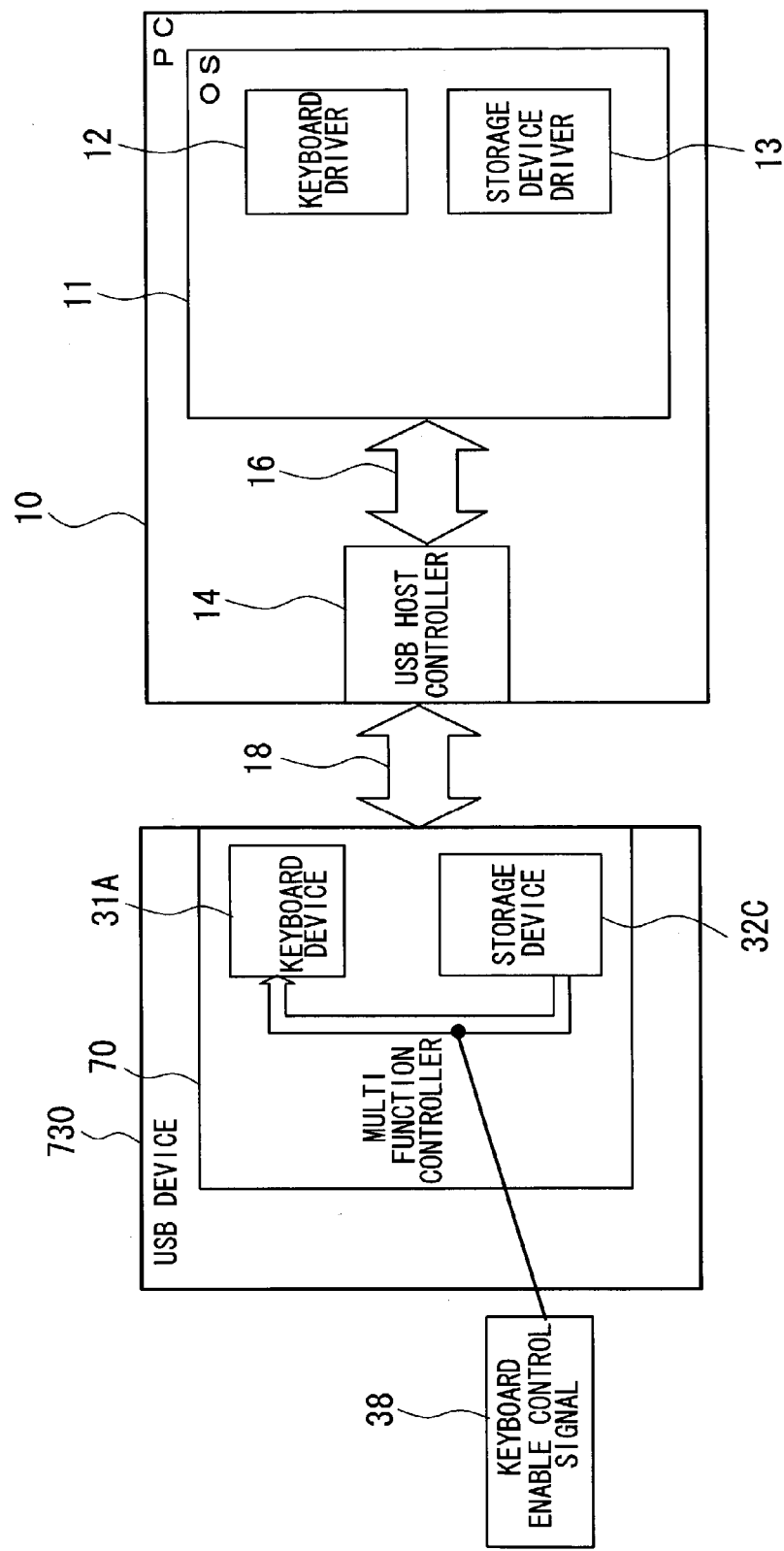
FIG. 24 is a block diagram of a structure according to an eighth embodiment of the present invention.

FIG. 24 is a block diagram of a structure according to an eighth embodiment of the present invention. In this figure, the same components as the components of the foregoing embodiments are denoted by like reference numerals. A USB device 730 is a modification of the USB device 330 shown in FIG. 14. In the structure shown in FIG. 14, the USB device 330 is connected to the PC 10 with the two USB cables 18A and 18B. In the structure shown in FIG. 24, on the other hand, the USB device 730 is connected to the PC 10 with one USB cable 18. This embodiment is valid in a case where two or more devices (functions) are allowed to form from one controller with one USB cable in accordance with the standard USB specification.

Figure 25:
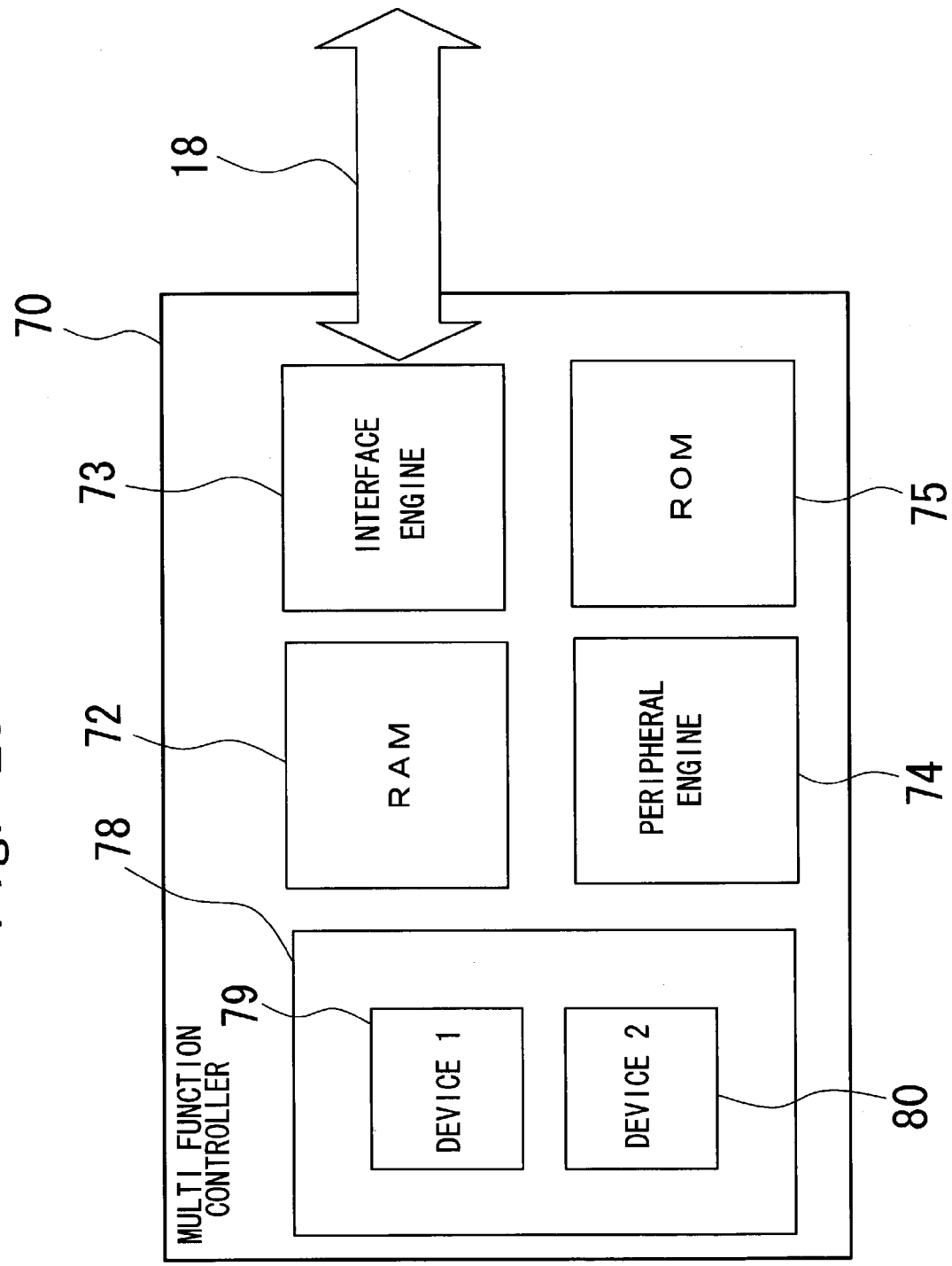
FIG. 25 illustrates the structure of the multi function controller shown in FIG. 24.

FIG. 25 illustrates the structure of the multi function controller 70 shown in FIG. 24. The structure shown in FIG. 25 differs from the structure shown in FIG. 17 in that only one USB cable is employed.

In accordance with the first through eighth embodiments described so far, the driver in the storage device 32, 32A, 32B, 32C, or 32D is updated, so that the updated driver can be installed in the OS 11. To do so, the information processing apparatus 10 writes the new driver in the storage device 32, 32A, 32B, 32C, or 32D. At the time of updating, a command data transaction is generated on the USB cable 18, 18A, or 18B. This process is carried out by the USB/hub controller 33, 33A, 33B, 33C, or 33D. In accordance with the command data, the information processing apparatus 10 is notified that the driver has been updated. The keyboard enabling control signal 38 is then set at the low level, so as to put the keyboard device 31, 31A, or 31B into a disable state. The keyboard driver 12 then vanishes from the memory under the control of the OS 11. Beyond this point, the updated keyboard driver is incorporated into the OS 11 in the same manner as the processing of step S12 of FIG. 5A. Accordingly, a reconnected state of the keyboard device 31, 31A, or 31B can be achieved without a mechanical connection thereof, and more dynamic updating can be performed on the driver.

The first through eighth embodiments are USB devices each equipped with a keyboard device. The present invention, however, is not limited to them, and may provide a USB device equipped with any electronic device other than a keyboard device. In this case, the driver of the electronic device is stored in the storage device. Also, each of the USB devices of the above described embodiments may be equipped with a plurality of devices. In such a case, the drivers for the plurality of devices are stored in the storage device.

Further, the present invention does not limit the interface to a USB, but may allow an electronic device to employ some other interface, such as a parallel interface, a serial interface, or an IEEE 1394 interface. The present invention also provides an electronic device having one of those interfaces in addition to a USB interface. The present invention further provides an electronic device that employs a wireless interface as well as a cable interface.

Finally, some aspects of the present invention are summarized below.

According to an aspect of the invention, an electronic device includes: a first device; a second device in which a driver of the first device is stored, the first device and second device being able to generate transactions on an interface shared for respective external connections; and a unit that starts an operation of the second device before starting an operation of the first device, so as to make the driver readable from the second device via the interface. When the electronic device is connected to an information processing device such as a personal computer, the unit causes the second device to start. This makes it possible the driver to be read on the interface from the second device. Thus, the driver can be installed in the information processing device. If it is supposed that the above-mentioned unit is not employed, the first and second devices can generate transactions on the interface shared for the respective external connections, and connections with the first and second devices will be simultaneously recognized. In this case, the information processing device will request the driver for the first device. In contrast, according to the aspect of the present invention, connection with the second device that stores the driver of the first device is recognized first without exception. This results in avoidance of the above-mentioned situation.

The electronic device may be configured so that the unit controls the first device to be in a disable state and then switch to an enable state. When the electronic device is connected to the information processing device, it is assured that only the second device is connected to the interface. It is therefore possible to assure that only the second device is connected to the interface when being connected to the information processing device and to read the driver of the first device on the interface and install it in the information processing device.

The electronic device may be configured so that the unit generates a control signal for controlling the first device to be in an enable state or a disable state, and outputs the control signal to the first device through a dedicated signal line. It is therefore possible to assure that only the second device is connected to the interface when being connected to the information processing device and read the driver of the first device on the interface and install it in the information processing device.

The electronic device may be configured so that the unit puts the first device in a disable state when the electronic device is connected to an information processing apparatus via the interface, and puts the first device in an enable state when the second device is recognized by the information processing apparatus. It is therefore possible to assure that only the second device is connected to the interface when being connected to the information processing device and read the driver of the first device on the interface and install it in the information processing device.

The electronic device may be configured so that the unit has a memory for storing control data used for controlling the first device to be in an enable state or a disable state. This configuration is employed in, for example, the fourth embodiment of the invention. According to the configuration, it is therefore possible to assure that only the second device is connected to the interface when being connected to the information processing device and read the driver of the first device on the interface and install it in the information processing device.

The electronic device may be configured so that it further comprises a hub controller that controls transactions among the first device, the second device, and the interface, the unit being provided within the hub controller. This configuration is employed in, for example, the first, second, third, sixth and seventh embodiments of the present invention.

The electronic device may be configured so that it further includes a hub controller that controls transactions among the first device, the second device, and the interface, the unit being provided within the second device. This configuration is employed in, for example, the third and seventh embodiments of the present invention.

The electronic device may be configured so that it further includes a hub controller that controls transactions among the first device, the second device, and the interface, the second device being provided within the hub controller, and including the unit, and the unit generating a control signal for controlling the first device to be in an enable state or a disable state, and outputting the control signal to the first device through a dedicated signal line. This configuration is employed in, for example, the third embodiment of the present invention.

The electronic device may be configured so that it further includes a hub controller that controls transactions among the first device, the second device, and the interface, the second device being provided within the hub controller, and including the unit; the unit generating a control signal for controlling the first device to be in an enable state or a disable state, and outputting the control signal to the first device through a hub port provided between the first device and the interface. This configuration is employed in, for example, the seventh embodiment of the present invention.

The electronic device may be configured so that the unit is provided within the second device. This configuration is employed in, for example, the fifth embodiment of the present invention.

The electronic device may be configured so that it further includes a hub controller that controls transactions among the first device, the second device, and the interface, the hub controller including the unit; the unit generating a control signal for controlling the first device to be in an enable state or a disable state, and outputting the control signal to the first device through a hub port provided between the first device and the interface. This configuration is employed in, for example, the sixth embodiment of the present invention.

The electronic device may be configured so that: the first device and the second device can be connected to an outside information processing apparatus via separate buses that constitute the interface; and the second device includes the unit. This configuration is employed in the fourth and fifth embodiments of the invention.

The electronic device may be configured so that it further includes a controller that controls the first device and the second device as a single physical device, the second device including the unit. This configuration is employed in the fourth embodiment of the present invention.

The electronic device may be configured so that it further includes a controller that controls the first device and the second device as a single physical device, the first device and the second device being connectable to an outside information processing apparatus via separate buses that constitute the interface, and the second device including the unit. This configuration is employed in the fourth embodiment of the present invention.

The electronic device may be configured so that it further includes a controller that controls the first device and the second device as a single physical device, the first device and the second device being connectable to an outside information processing apparatus via a common bus that constitutes the interface, and the second device including the unit. This configuration is employed in, the eighth embodiment of the invention.

The electronic device may be configured so that the unit controls the first device so as to switch from an enable state to a disable state, when the driver of the first device is updated. Thus, the first device is put in the isolated state, while the updated driver in the second device can be read onto the interface and the driver of the first device can be updated.

The electronic device may be configured so that the second device includes a non-volatile storage unit for storing the driver.

Although a few preferred embodiments of the present invention have been shorn and described, it would be appreciated by those skilled in the art that changes may be made in these embodiments without departing from the principles and spirit of the invention, the scope of which is defined in the claims and their equivalents.

What is claimed is:

1. An electronic device, comprising:
a first device;
a second device in which a driver of the first device is stored, the first device and second device being able to generate transactions on an interface shared for respective external connections; and
a unit that starts an operation of the second device before starting an operation of the first device, so as to make the driver readable from the second device via the interface, the unit, further, controlling the first device to be in a disable state and then to switch to an enable state before the driver is read from the second device and is installed to a computer to which the electronic device is connected.

2. The electronic device as claimed in claim 1, wherein the unit generates a control signal for controlling the first device to be in an enable state or a disable state, and outputs the control signal to the first device through a dedicated signal line.

3. The electronic device as claimed in claim 1, wherein the unit puts the first device in a disable state when the electronic device is connected to an information processing apparatus via the interface, and puts the first device in an enable state when the second device is recognized by the information processing apparatus.

4. The electronic device as claimed in claim 1, wherein the unit has a memory for storing control data used for controlling the first device to be in an enable state or a disable state.

5. An electronic device, comprising:
a first device;
a second device in which a driver of the first device is stored, the first device and the second device being able to generate transactions on an interface shared for respective external connections;
a hub controller that controls transactions among the first device, the second device, and the interface; and
a unit within the hub controller that starts an operation of the second device before starting an operation of the first device, so as to make the driver readable from the second device via the interface, the unit, further, controlling the first device to be in a disable state and then to switch to an enable state before the driver is read from the second device and is installed to a computer to which the electronic device is connected.

6. An electronic device, comprising:
a first device;
a second device in which a driver of the first device is stored, the first device and the second device being able to generate transactions on an interface shared for respective external connections;
a hub controller that controls transactions among the first device, the second device, and the interface; and
a unit within the second device that starts an operation of the second device before starting an operation of the first device, so as to make the driver readable from the second device via the interface, the unit, further, controlling the first device to be in a disable state and then to switch to an enable state before the driver is read from the second device and is installed to a computer to which the electronic device is connected.

7. An electronic device, comprising:
a first device;
a second device in which a driver of the first device is stored, the first device and second device being able to generate transactions on an interface shared for respective external connections;
a unit that starts an operation of the second device before starting an operation of the first device, so as to make the driver readable from the second device via the interface;
a hub controller that controls transactions among the first device, the second device, and the interface, the second device being provided within the hub controller and including the unit; and
the unit generating a control signal for controlling the first device to be in an enable state or a disable state and to switch the first device from the disable state to the enable state before the driver is read from the second device and is installed to a computer to which the electronic device is connected, and outputting the control signal to the first device through a dedicated signal line.

8. An electronic device, comprising:
a first device;
a second device in which a driver of the first device is stored, the first device and second device being able to generate transactions on an interface shared for respective external connections;
a unit that starts an operation of the second device before starting an operation of the first device, so as to make the driver readable from the second device via the interface;
a hub controller that controls transactions among the first device, the second device, and the interface, the second device being provided within the hub controller and including the unit; and
the unit generating a control signal for controlling the first device to be in an enable state or a disable state and to switch the first device from the disable state to the enable state before the driver is read from the second device and is installed to a computer to which the electronic device is connected, and outputting the control signal to the first device through a hub port provided between the first device and the interface.

9. The electronic device as claimed in claim 1, wherein the unit is provided within the second device.

10. The electronic device as claimed in claim 1, further comprising a hub controller that controls transactions among the first device, the second device, and the interface,
the hub controller including the unit;

the unit generating a control signal for controlling the first device to be in an enable state or a disable state, and outputting the control signal to the first device through a hub port provided between the first device and the interface.

11. The electronic device as claimed in claim 1, wherein:
the first device and the second device can be connected to an outside information processing apparatus via separate buses that constitute the interface; and
the second device includes the unit.

12. The electronic device as claimed in claim 1, further comprising a controller that controls the first device and the second device as a single physical device, the second device including the unit.

13. The electronic device as claimed in claim 1, further comprising a controller that controls the first device and the second device as a single physical device, the first device and the second device being connectable to an outside information processing apparatus via separate buses that constitute the interface, and the second device including the unit.

14. The electronic device as claimed in claim 1, further comprising a controller that controls the first device and the second device as a single physical device, the first device and the second device being connectable to an outside information processing apparatus via a common bus that constitutes the interface, and the second device including the unit.

15. The electronic device as claimed in claim 1, wherein the unit controls the first device so as to switch from an enable state to a disable state, when the driver of the first device is updated.

16. The electronic device as claimed in claim 1, wherein the second device includes a non-volatile storage unit for storing the driver.

17. A method of controlling an electronic device that includes a first device and a second device storing a driver of the first device, and can generate transactions on an interface shared for external connection, the method comprising:

starting an operation of the second device before an operation of the first device, so as to make the driver readable from the second device via the interface; and controlling the first device to be in a disable state and then to switch to an enable state before the driver is read from the second device and is installed to a computer to which the electronic device is connected.

18. A system, comprising:

an electronic device including a first device and a second device storing a driver of the first device and generating transactions on an interface shared for respective external connections;

an information processing apparatus to be connected to the electronic device via the interface: and the electronic device further comprising a unit that starts an operation of the second device before starting an operation of the first device, so as to make the driver readable from the second device via the interface, the unit, further, controlling the first device to be in a disable state and then to switch to an enable state before the driver is read from the second device and is installed to a computer to which the electronic device is connected.

* * * * *